US012750642B2

(12) United States Patent
Luo et al.

(10) Patent No.: US 12,750,642 B2
(45) Date of Patent: Sep. 29, 2026

(54) SENSING METHOD AND DEVICE

(71) Applicant: GUANGDONG OPPO MOBILE TELECOMMUNICATIONS CORP., LTD., Dongguan (CN)

(72) Inventors: Chaoming Luo, Dongguan (CN); Lei Huang, Singapore (SG)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 287 days.

(21) Appl. No.: 18/755,142

(22) Filed: Jun. 26, 2024

(65) Prior Publication Data

US 2024/0349024 A1 Oct. 17, 2024

Related U.S. Application Data

(63) Continuation of application No. PCT/CN2022/070825, filed on Jan. 7, 2022.

(51) Int. Cl.
*H04W 4/38* (2018.01)

(52) U.S. Cl.
CPC .................................... *H04W 4/38* (2018.02)

(58) Field of Classification Search
CPC ......... H04W 4/38; H04W 4/80; H04W 24/10; H04W 24/02; H04W 88/08; H04W 84/12
See application file for complete search history.

(56) References Cited

U.S. PATENT DOCUMENTS 10,116,545 B2 * 10/2018 Yu .......................... H04L 41/00
11,935,399 B2 * 3/2024 Kimura ................. G08C 17/02
2020/0244742 A1 7/2020 Henshaw et al.
2020/0388145 A1 * 12/2020 Maruyama ............. G01D 21/00
2021/0150828 A1 * 5/2021 Mezaael ................. H04W 4/40
2021/0258175 A1 * 8/2021 Sugaya ...................... H04L 9/36
2021/0306425 A1 * 9/2021 Baugh ..................... G05B 17/02
2022/0167138 A1 * 5/2022 Vadivel ..................... G01V 1/01
2022/0255908 A1 * 8/2022 Kang ...................... H04W 4/80
2023/0020935 A1 * 1/2023 Liu .................... G01C 21/3815
2023/0045302 A1 * 2/2023 Park ........................ G06F 3/167
(Continued)

FOREIGN PATENT DOCUMENTS

CN 111177778 A 5/2020
CN 111970166 A 11/2020
(Continued)

OTHER PUBLICATIONS

PCT International Search Report for International Application No. PCT/CN2022/070825 dated Sep. 27, 2022.
(Continued)

*Primary Examiner* — Syed Ali
(74) *Attorney, Agent, or Firm* — Sheppard, Mullin, Richter & Hampton LLP

(57) ABSTRACT

Disclosed are a sensing method and device, and the method includes: transmitting, by a first device, first information to a second device, where the first information is used to indicate information about a result of establishing a sensing process by the first device, the sensing process includes an establishment process of a measurement setup and/or a measurement process, and the sensing process is established by the first device based on a proxy request of the second device.

13 Claims, 16 Drawing Sheets

(56) References Cited

U.S. PATENT DOCUMENTS

| | | | | |
|---|---|---|---|---|
| 2023/0087035 A1* | 3/2023 | Liu | H04W 4/44 | 455/418 |
| 2023/0216602 A1* | 7/2023 | Wang | H04B 7/10 | 343/702 |
| 2023/0353555 A1* | 11/2023 | Kim | H04W 12/069 | |

FOREIGN PATENT DOCUMENTS

| | | |
|---|---|---|
| CN | 112689300 A | 4/2021 |
| CN | 112738758 A | 4/2021 |

OTHER PUBLICATIONS

PCT Written opinion for International Application No. PCT/CN2022/070825 dated Sep. 27, 2022.
"Further Discussion On short TTI" Of Nokia et al., 3GPP TSG RAN WG1 Meeting # 89 R1-1708560 dated May 19, 2017, all pages.
"80211-2020—Wireless LAN Medium Access Control (MAC) and Physical Layer (PHY) Specifications" of IEEE Computer Society dated Dec. 3, 2020.
"11-20-1232-00-SENS-overview-of-wlan-sensing-protocol" of Chen Cheng et al., (Intel),doc.: IEEE 802.11-20/1232r0 dated Aug. 16, 2020.
"11-20-1804-01-00bf-discussion-on-wlan-sensing-procedure" of Insun Jang et al. (LG Electronics), doc.: IEEE 802.11-20/1804r1 dated Nov. 9, 2020.
"11-20-1849-04-00bf-wi-fi-sensing-definitions" of Chen Cheng et al., (Intel), doc.: IEEE 802.11-20/1849r4 dated Nov. 15, 2020.
"11-20-1851-04-00bf-overview-of-wi-fi-sensing-protocol" of Chen Cheng et al. (Intel), doc.: IEEE 802.11-20/1851r3 dated Nov. 12, 2020.
"11-20-1938-05-00be-tb-su-ppdu-and-tb-p2p-ppdu-consideration" of Jay Yang et al. (Nokia), doc.: IEEE 802.11-20/1938r5 dated Apr. 19, 2021.
"11-21-0147-03-00bf-definitions-and-scenarios-of-the-wlan-sensing-follow-ups" of Du Rui et al. (Huawei Technologies Co. Ltd), doc.: IEEE 802.11-21/0147r3 dated Jan. 26, 2021.
"11-21-0357-00-00bf-discussion-of-sensing-measurement-result-types" of Claudio da Silva et al. (Intel), doc.: IEEE 802.11-21/0357r0 dated Mar. 5, 2021.
"11-21-0365-01-00bf-wi-fi-sensing-parameters" of Halise Turkmen et al. (Vestel), doc.: IEEE 802.11-21/0365r1 dated Mar. 3, 2021.
"11-21-0504-03-00bf-specification-framework-for-tgbf" of Claudio da Silva (Facebook), doc.: IEEE 802.11-21/0504r3 dated Jul. 20, 2021.
"11-21-0644-03-00bf-sensing-session-and-measurement-exchange-identification" of Solomon Trainin et al. (Qualcomm), doc.: IEEE 802.11-21/0644r3 dated May 10, 2021.
"11-21-0990-02-00bf-discussions-on-sensing-measurement-flows" of Chen Cheng et al. (Intel), doc.: IEEE 802.11-21/0990r2 dated Jun. 16, 2021.
"11-21-1015-01-00bf-non-tb-and-tb-measurement-procedure-for-wlan-sensing" of Dongguk Lim et al. (LG Electronics), doc.: IEEE 802.11-21/1015r1 dated Jul. 27, 2021.
"11-21-1321-01-00bf-wlan-sensing-procedure" of Solomon Trainin et al. (Qualcomm), doc.: IEEE 802.11-21/1321r1 dated Aug. 2, 2021.
"11-21-1322-03-00bf-wlan-sensing-procedure-text" of Solomon Trainin et al. (Qualcomm), doc.: IEEE 802.11-21/1322r3 dated Aug. 9, 2021.
"11-21-1684-00-00bf-proxy-for-non-ap-initiator" of Chaoming Luo et al. (OPPO), doc.: IEEE 802.11-21/1684r0 dated Oct. 14, 2021.
"11-21-1692-04-00bf-enhancing-client-based-sensing-sensing-by-proxy" of Claudio da Silva et al. (Meta Platforms, Inc. et al.), doc.: IEEE 802.11-21/1692r4 dated Oct. 22, 2021.
"11-21-1701-00-00bf-measurement-setup-termination" of Solomon Trainin et al. (Qualcomm), doc.: IEEE 802.11-21/1701r1 dated Oct. 18, 2021.
"11-21-1934-00-00bf-discussion-on-session-setup" of Chaoming Luo et al. (OPPO), doc.: IEEE 802.11-21/1934r0 dated Nov. 29, 2021.
"80211-2020—Wireless LAN Medium Access Control (MAC) and Physical Layer (PHY) Specifications" of IEEE Computer Society dated Mar. 25, 2021.

* cited by examiner

300

SENSING METHOD AND DEVICE

CROSS-REFERENCE TO RELATED APPLICATIONS

This application is a continuation of International Application No. PCT/CN2022/070825, filed on Jan. 7, 2022, the disclosure of which is hereby incorporated by reference in its entirety.

TECHNICAL FIELD

Embodiments of this application relate to the field of communications, and specifically to a sensing method and device.

BACKGROUND

Sensing is a function enhancement proposed by the 802.11bf standard in the protocol 802.11, according to which surroundings are measured and sensed through wireless signals, so that various functions such as detection of indoor intrusion, movement, falls, and the like, gesture recognition, and creation of a spatial three-dimensional image can be implemented. In some scenarios, introduction of sensing by proxy (SBP) is considered, that is, a device (for example, a station device) may establish a sensing process by using another device (an access point device) as a proxy. In this case, how to manage a process of sensing by proxy is an urgent problem to be solved.

SUMMARY

This application provides a sensing method and device, and a sensing by proxy device may report, to a sensing by proxy requester, information about the result of establishing a sensing process by the proxy.

According to a first aspect, a sensing method is provided and includes: transmitting, by a first device, first information to a second device, where the first information is used to indicate information about the result of establishing a sensing process by the first device, the sensing process includes an establishment process of measurement setup(s) and/or measurement process(es), and the sensing process is established by the first device based on a proxy request of the second device.

According to a second aspect, a sensing method is provided and includes: receiving, by a second device, first information transmitted by a first device, where the first information is used to indicate information about the result of establishing a sensing process by the first device, the sensing process includes an establishment process of measurement setup(s) and/or measurement process(es), and the sensing process is established by the first device based on a proxy request of the second device.

According to a third aspect, a sensing device is provided and configured to execute a method according to the first aspect or implementations of the first aspect. Specifically, the sensing device includes a functional module configured to execute a method according to the first aspect or implementations of the first aspect.

According to a fourth aspect, a sensing device is provided and configured to execute a method according to the second aspect or implementations of the second aspect. Specifically, the sensing device includes a functional module configured to execute a method according to the second aspect or implementations of the second aspect.

According to a fifth aspect, a sensing device is provided, including a processor and a memory. The memory is configured to store a computer program, and the processor is configured to invoke the computer program stored in the memory and run the computer program, to cause the sensing device to execute a method according to the first aspect or implementations of the first aspect.

According to a sixth aspect, a sensing device is provided, including a processor and a memory. The memory is configured to store a computer program, and the processor is configured to invoke the computer program stored in the memory and run the computer program, to cause the sensing device to execute a method according to the second aspect or implementations of the second aspect.

According to a seventh aspect, a chip is provided and configured to implement a method according to any one of the first aspect and the second aspect or implementations of the first aspect and the second aspect. Specifically, the chip includes a processor, configured to invoke a computer program from a memory and run the computer program, to cause a device on which the chip is installed to execute a method according to any one of the first aspect and the second aspect or implementations of the first aspect and the second aspect.

According to an eighth aspect, a computer-readable storage medium is provided and configured to store a computer program, where the computer program causes a computer to execute a method according to any one of the first aspect and the second aspect or implementations of the first aspect and the second aspect.

According to a ninth aspect, a computer program product is provided, including computer program instructions, where the computer program instructions cause a computer to execute a method according to any one of the first aspect and the second aspect or implementations of the first aspect and the second aspect.

According to a tenth aspect, a computer program is provided, and when the computer program runs on a computer, the computer executes a method according to any one of the first aspect and the second aspect or implementations of the first aspect and the second aspect.

According to the foregoing technical solutions, a sensing by proxy device may transmit, to a sensing by proxy requester, information about a result of establishing a sensing process by a proxy, thereby improving a process of sensing by proxy.

DESCRIPTION OF EMBODIMENTS

The following describes the technical solutions in embodiments of this application with reference to the accompanying drawings in embodiments of this application. Apparently, the described embodiments are some rather than all of embodiments of this application. For embodiments of this application, all other embodiments obtained by a person of ordinary skill in the art without creative efforts fall within the protection scope of this application.

The technical solutions in embodiments of this application may be applied to various communications systems, for example, wireless local area network (WLAN), wireless fidelity (Wi-Fi), or another communications system.

Figure 1:
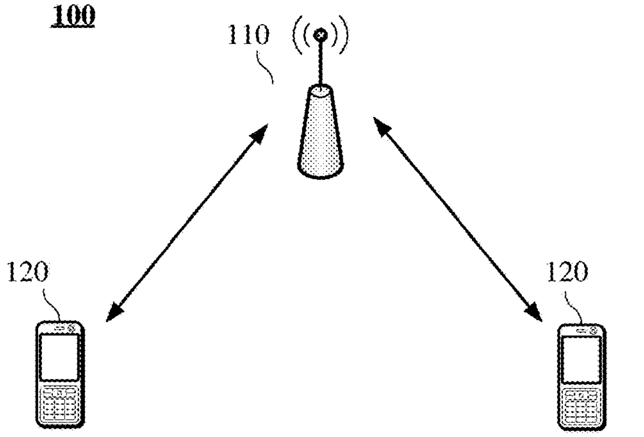
FIG. 1 is a schematic diagram of an architecture of a communications system according to an embodiment of this application.

For example, a communications system 100 to which an embodiment of this application is applied is shown in FIG. 1. The communications system 100 may include an access point (AP) 110 and a station (STA) 120 that access a network by using the access point 110.

In some scenarios, an AP is referred to as an AP STA. That is, in a sense, the AP is also a STA.

In some scenarios, a STA is referred to as a non-AP STA.

Communication in the communications system 100 may be communication between an AP and a non-AP STA, or may be communication between a non-AP STA and another non-AP STA, or communication between a STA and a peer STA. The peer STA may refer to a device that performs peer-to-peer communication with a STA, for example, the peer STA may be an AP, or may be a non-AP STA.

An AP is equivalent to a bridge that connects a wired network and a wireless network. A major function of the AP is to connect clients in a wireless network together and then connects the wireless network to an Ethernet. An AP device may be a terminal device (for example, a mobile phone) having a Wi-Fi chip or a network device (for example, a router) having a Wi-Fi chip.

It should be understood that a role of a STA in a communications system is not fixed. For example, in some scenarios, when a mobile phone is connected to a route, the mobile phone is a non-AP STA; when the mobile phone serves as a hotspot of another mobile phone, the mobile phone serves as an AP.

The AP and the non-AP STA may be devices applied in vehicle-to-everything; internet of things nodes, sensors, and the like in internet of things (IoT); intelligent cameras, intelligent remote controls, intelligent water meters, intelligent electricity meters, and the like in smart home; and sensors and the like in smart city.

In some embodiments, the non-AP STA may support an 802.11be standard. The non-AP STA may also support a plurality of current and future wireless local area network (WLAN) standards of an 802.11 family, such as 802.11ax, 802.11ac, 802.11n, 802.11g, 802.11b, and 802.11a.

In some embodiments, the AP may be a device that supports the 802.11be standard. The AP may alternatively be a device that supports a plurality of current and future WLAN standards of the 802.11 family, such as 802.11ax, 802.11ac, 802.11n, 802.11g, 802.11b, and 802.11a.

In embodiments of this application, the STA may be a device that supports a WLAN or Wi-Fi technology, such as a mobile phone, a pad, a computer, a virtual reality (VR) device, an augmented reality (AR) device, a wireless device in industrial control, a set-top box, a wireless device in self-driving, a vehicle-mounted communications device, a wireless device in remote medical, a wireless device in smart grid, a wireless device in transportation safety, a wireless device in smart city, a wireless device in smart home, a wireless communications chip, an ASIC, a SoC, or the like.

Frequency bands supported in a WLAN technology may include but are not limited to a low frequency band (such as 2.4 GHz, 5 GHz, or 6 GHz) and a high frequency band (for example, 60 GHz).

FIG. 1 exemplarily shows one AP STA and two non-AP STAs. Optionally, the communications system 100 may include a plurality of AP STAs and another quantity of non-AP STAs. This is not limited in embodiments of this application.

It should be understood that in embodiments of this application, a device having a communication function in a network or a system may be referred to as a communications device. The communications system 100 shown in FIG. 1 is used as an example. A communications device may include the access point 110 and the station 120 that have a communication function. The access point 110 and the station 120 may be specific devices described above. Details are not described herein again. The communications device may further include another device in the communications system 100, such as a network controller or a gateway, which is not limited in embodiments of this application.

It should be understood that the terms "system" and "network" may often be used interchangeably herein. In this specification, the term "and/or" is merely an association relationship that describes associated objects, and represents that there may be three relationships. For example, A and/or B may represent three cases: only A exists, both A and B exist, and only B exists. In addition, the character "/" in this specification generally indicates an "or" relationship between the associated objects.

It should be understood that, the "indication" mentioned in embodiments of this application may be a direct indication or an indirect indication, or indicate an association. For example, if A indicates B, it may mean that A directly indicates B, for example, B can be obtained from A. Alternatively, it may mean that A indicates B indirectly, for example, A indicates C, and B can be obtained from C. Alternatively, it may mean that there is an association between A and B.

In the description of embodiments of this application, the term "corresponding" may mean that there is a direct or indirect correspondence between two elements, or that there is an association between two elements, or that there is a relationship of "indicating" and "being indicated", "configuring" and "being configured", or the like.

In embodiments of this application, the "predefining" may be implemented in a manner in which corresponding code, a table, or other related information used for indication is pre-stored in a device (for example, including an access point and a station). A specific implementation is not limited in this application. For example, pre-defining may refer to being defined in a protocol.

To facilitate understanding of the technical solutions of embodiments of this application, relevant terms of this application are explained below.

Association identifier (AID) is used to identify a terminal that has established an association with an access point.

Medium access control (MAC) is a short name of medium access control address.

Transmission opportunity (TXOP) refers to a period of time during which a terminal with the transmission opportunity may actively initiate one or more transmissions.

Burst generally refers to a short period of time during which one or more signals are transmitted.

Burst group refers to a combination of one or more bursts. Bursts in a same burst group generally have some common features.

Sensing measurement is to sense people or objects in an environment by measuring changes in a signal after the signal is scattered and/or reflected by people or objects. That is, sensing measurement is to measure and sense a surrounding environment through wireless signals, so that various functions such as detection of indoor intrusion, movement, falls, and the like, gesture recognition, and creation of a spatial three-dimensional image may be implemented.

Devices involved in sensing measurement may include the following roles:

a sensing initiator: a device that initiates a sensing session and expects to obtain a sensing result;

a sensing responder: a device that is not a sensing initiator and participates in a sensing session;

a sensing transmitter: a device that transmits a sensing measurement signal (sensing illumination signal), or referred to as a sensing signal transmitter;

a sensing receiver: a device that receives a sensing measurement signal (sensing illumination signal), or referred to as a sensing signal receiver;

a sensing processor: a device that processes a result of sensing measurement; and a sensing participant, including a sensing initiator, sensing transmitter(s) and sensing receiver(s).

A device may have one or more roles in one sensing measurement. For example, a sensing initiator may be only a sensing initiator, or may also be a sensing transmitter, or may also be a sensing receiver, or may also be both a sensing transmitter and a sensing receiver.

Figure 2:
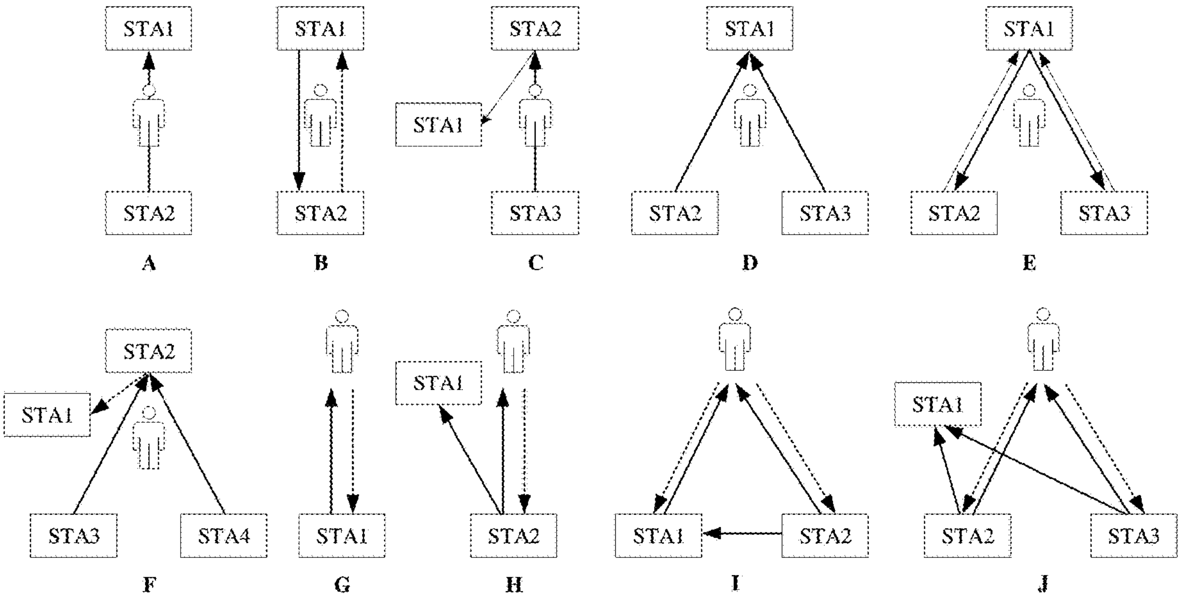
FIG. 2 is a schematic diagram of a Wi-Fi sensing process.

For example, as shown in A of FIG. 2, a STA1 may be a sensing initiator, may be a sensing receiver, or may be a sensing processor; and a STA2 may be a sensing transmitter.

For another example, as shown in B of FIG. 2, a STA1 may be a sensing initiator, or may be a sensing transmitter; and a STA2 may be a sensing receiver or a sensing processor.

For another example, as shown in C of FIG. 2, a STA1 may be a sensing initiator, or may be a sensing processor; a STA2 may be a sensing receiver; and a STA3 may be a sensing transmitter.

For another example, as shown in D of FIG. 2, a STA1 may be a sensing initiator, may be a sensing receiver, or may be a sensing processor; a STA2 may be a sensing transmitter; and a STA3 may be a sensing transmitter.

For another example, as shown in E of FIG. 2, a STA1 may be a sensing initiator, may be a sensing transmitter, or may be a sensing processor; a STA2 may be a sensing receiver; and a STA3 may a sensing receiver.

For another example, as shown in F of FIG. 2, a STA1 may be a sensing initiator; a STA2 may be a sensing receiver, or may be a sensing processor; a STA3 may be a sensing transmitter; and STA4 may be a sensing transmitter.

For another example, as shown in G of FIG. 2, a STA1 may be a sensing initiator, may be a sensing transmitter, may be a sensing receiver, or may be a sensing processor.

For another example, as shown in H of FIG. 2, a STA1 may be a sensing initiator; a STA2 may be a sensing transmitter, may be a sensing receiver, or may be a sensing processor.

For another example, as shown in I of FIG. 2, a STA1 may be a sensing initiator, may be a sensing transmitter, may be a sensing receiver, or may be a sensing processor; and a STA2 may be a sensing transmitter, or may be a sensing receiver.

For another example, as shown in J of FIG. 2, a STA1 may be a sensing initiator, or may be a sensing processor; a STA2 may be a sensing transmitter, or may be a sensing receiver; and a STA3 may be a sensing transmitter, or may be a sensing receiver.

It should be noted that FIG. 2 is merely an example of this application and should not be construed as a limitation to this application. For example, the STA1, the STA2, and the STA3 in FIG. 2 only represent roles of a STA. In FIG. 2 and subsequent steps such as sensing session and measurement, a quantity of STAs is not limited. For example, roles represented by the STA1, the STA2, and the STA3 may be implemented as one or more STAs.

In some embodiments, there may be a plurality of sensing types. For example, there is a sensing type based on channel state information (CSI), namely, CSI-based Sensing. In this sensing type, a sensing measurement result is obtained by processing CSI of a received sensing measurement signal. For another example, there is a sensing type based on a reflection signal, namely, Radar-based Sensing. In this sensing type, a sensing measurement result is obtained by processing a reflection signal of a received sensing measurement signal.

In embodiments of this application, the sensing initiator is also referred to as an initiator or a sensing session initiator, and the sensing responder is also referred to as a responder, or a sensing session responder.

A WLAN sensing session includes one or more of the following phases: session establishment, sensing measurement setup establishment, sensing measurement, sensing reporting, sensing measurement setup termination, or session termination.

Session establishment phase: establishing a sensing session, exchanging sensing capabilities of both parties and/or determining operating parameters related to sensing measurement, or declaring, by a terminal, its own role and operating parameters (for example, by using a beacon frame or another special frame).

Sensing measurement setup establishment phase: determining sensing participants and their roles (including a sensing signal transmitter and a sensing signal receiver), determining operating parameters related to sensing measurement, and optionally exchanging the parameters between terminals.

Sensing measurement phase: implementing sensing measurement, where the sensing signal transmitter(s) transmit sensing signal(s) to the sensing signal receiver(s).

Sensing reporting phase: reporting measurement result(s), where depending on an application scenario, the sensing signal receiver(s) may need to report measurement result(s) to the sensing session initiator.

Sensing measurement setup termination phase: terminating one or more measurement setups, stopping corresponding measurement, and releasing related storage and computing resources.

Session termination phase: terminating all measurement setups, stopping measurement, and terminating a sensing session.

A data volume of a sensing measurement result is usually large, for example, a data volume of channel state information (CSI) of one measurement may reach 4 k to 40 k bits. A measurement threshold may be set to reduce a network load caused by reporting the sensing measurement result. When a variation between a current sensing measurement result and a previous sensing measurement result is larger than the measurement threshold, a sensing signal receiver reports the sensing measurement result; otherwise, the sensing measurement result is not reported.

The sensing initiator may set a plurality of groups of measurement parameters. A group of measurement parameters (identified by a measurement setup ID, which may be equivalent to a burst group) may be applied to a plurality of measurements (each measurement is identified by a measurement instance ID, which may be equivalent to a burst).

In some embodiments, the sensing session initiator may set a plurality of groups of measurement parameters by using a measurement setup procedure. One measurement setup (or referred to as measurement configuration, Measurement Configuration) generally includes a group of measurement parameters, which may be identified by a measurement setup identity (Measurement Setup ID). One measurement setup may be applied to a plurality of measurements. One measurement (may be equivalent to a burst) may be considered as one measurement instance, and a measurement instance may be identified by a measurement instance identity (Measurement Instance ID).

In some embodiments, in order to reduce overheads of sensing measurement reporting and interference to another device, a trigger based (TB) measurement procedure may be executed, including three stages: a sensing measurement setup phase, a sensing measurement phase, and a sensing measurement reporting phase. In the sensing measurement setup phase, operating parameters, namely, a measurement setup, for implementing sensing measurement is mainly interacted or negotiated; in the sensing measurement phase, sensing measurement(s) are mainly implemented based on the measurement setup; and in the sensing measurement reporting phase, measurement result(s) are mainly reported.

Figure 3:
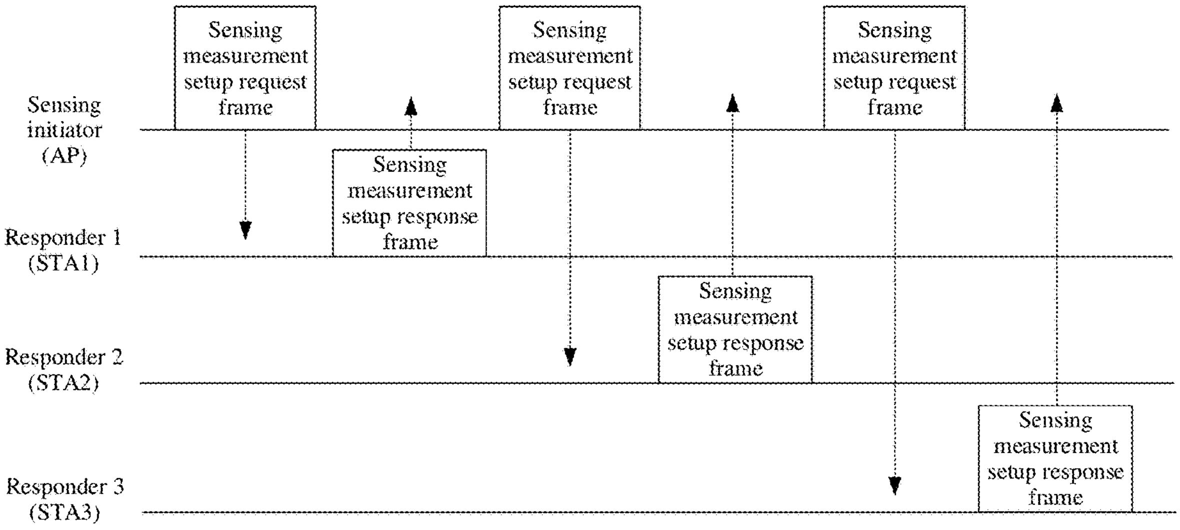
FIG. 3 is a schematic interaction diagram of a sensing measurement setup phase according to an embodiment of this application.

FIG. 3 is a schematic interaction diagram of a sensing measurement setup phase. As shown in FIG. 3, in the sensing measurement setup phase, the sensing initiator (for example, an AP device) and at least one sensing responder determine operating parameters, namely, a measurement setup, for implementing measurement by using a sensing measurement setup request frame and a sensing measurement setup response frame.

Figure 4:
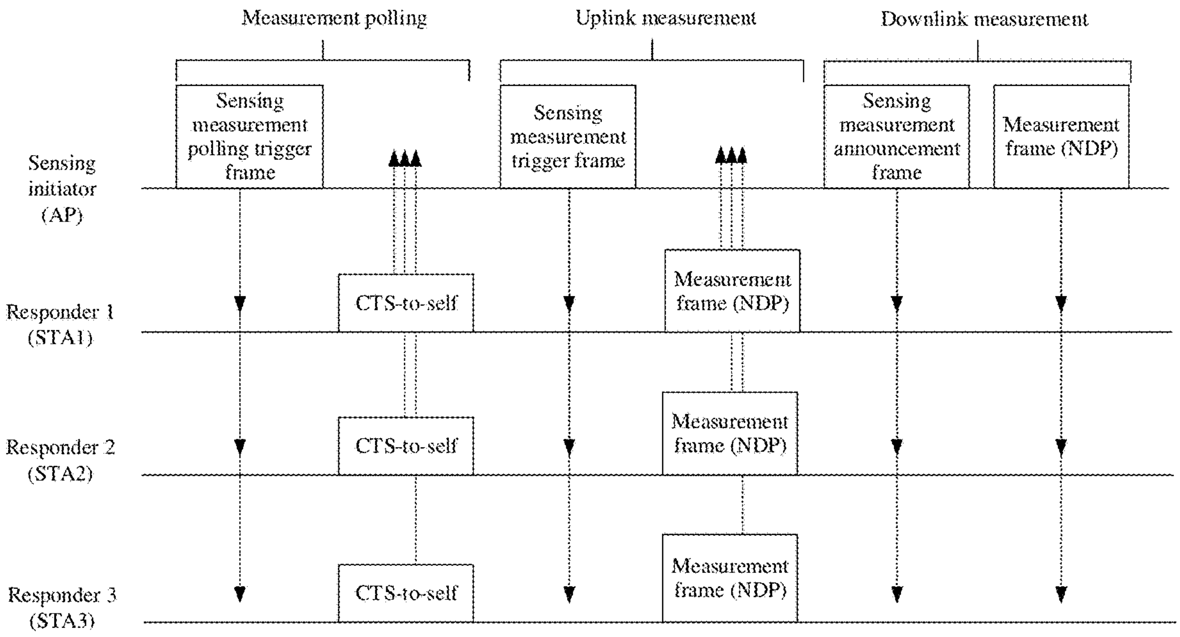
FIG. 4 is a schematic interaction diagram of a sensing measurement phase according to an embodiment of this application.

FIG. 4 is a schematic interaction diagram of a sensing measurement phase. As shown in FIG. 4, in the sensing measurement phase, a sensing initiator (for example, an AP device) determines, by using a sensing measurement polling trigger frame, sensing responder(s) that performs measurement, further triggers, by using a sensing measurement trigger frame, the sensing responder(s) that performs measurement to transmit a measurement frame (for example, a null data physical protocol data unit (NDP)) for uplink measurement, and notifies, through NDP announcement (NDPA), the sensing responder(s) to receive the measurement frame for downlink measurement.

Figure 5:
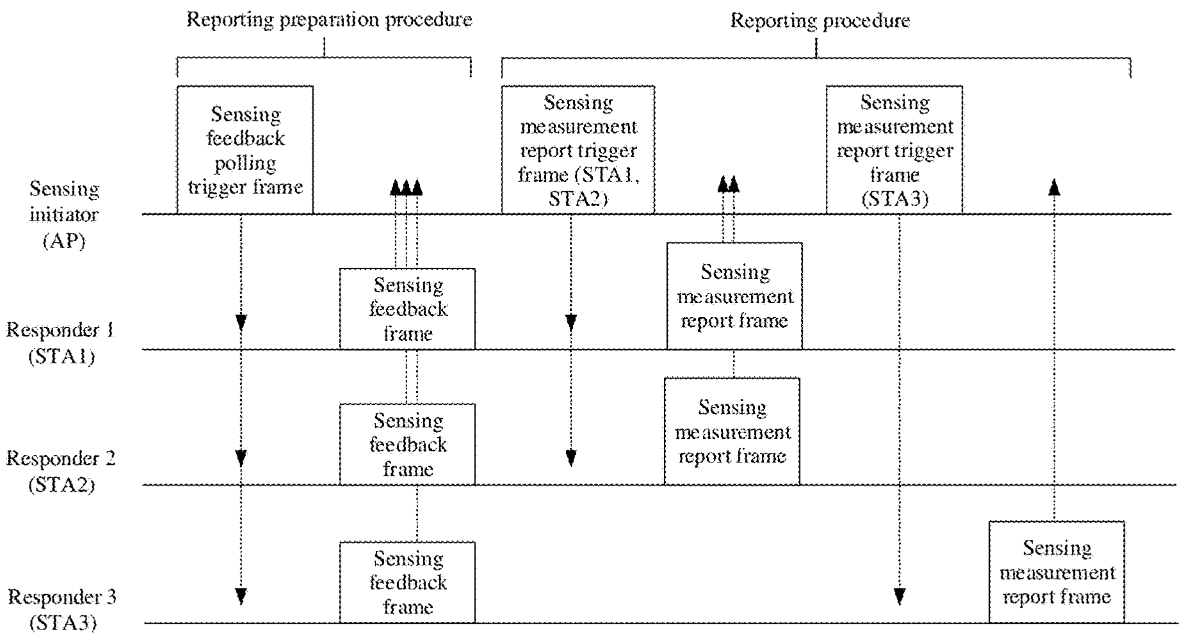
FIG. 5 is a schematic interaction diagram of a sensing reporting phase according to an embodiment of this application.

FIG. 5 is a schematic interaction diagram of a sensing reporting phase. As shown in FIG. 5, in the sensing reporting phase, a sensing initiator (for example, an AP device) determines, by using a sensing feedback polling trigger frame, sensing responder(s) that performs measurement reporting. In response to the sensing feedback polling trigger frame, the sensing responder may transmit a sensing feedback frame to an access point device. Further, the access point device triggers, by using sensing measurement report trigger frame, the sensing responder(s) that performs measurement reporting to transmit sensing measurement report frame(s). The sensing feedback frame may be carried by using a TB physical protocol data unit (PPDU).

In some cases, when only one pair of devices performs sensing measurement, a non-trigger (non-TB) measurement procedure may be used.

Figure 6:
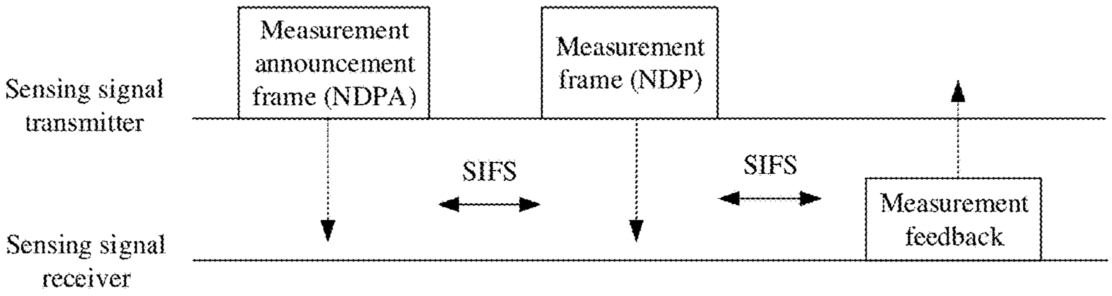
FIG. 6 is a schematic interaction diagram of a sensing measurement phase and a sensing reporting phase according to an embodiment of this application.

In some scenarios, as shown in FIG. 6, the sensing initiator is a sensing signal transmitter. The sensing signal transmitter may transmit an NDPA frame to announce start of measurement, and after a short interframe space (SIFS) time, transmit an NDP frame. The sensing signal receiver receives the NDP frame to generate a measurement result. After the SIFS time, the sensing signal receiver reports the measurement result to the sensing initiator.

Figure 7:
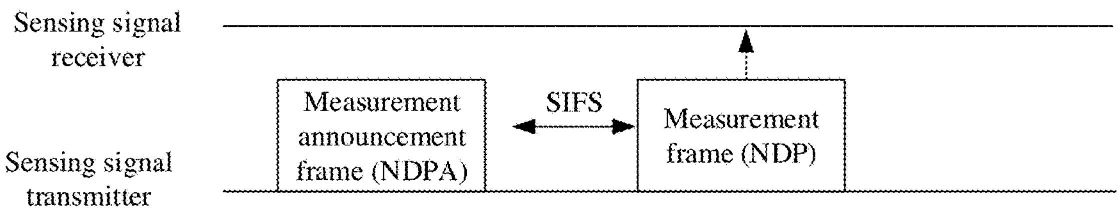
FIG. 7 is a schematic interaction diagram of another sensing measurement phase according to an embodiment of this application.

In some other scenarios, the sensing initiator is a sensing signal receiver. As shown in FIG. 7, the sensing signal transmitter may transmit an NDPA frame to announce start of measurement, and after the SIFS time, transmit an NDP frame. The sensing signal receiver receives the NDP frame to generate a measurement result, and there is no need to report the measurement result.

The sensing signal receiver may report the measurement result in a manner of immediate report or delayed report. Optionally, the delayed report may be explicitly requested by the sensing initiator.

In some scenarios, introduction of sensing by proxy is considered, that is, a device (for example, a STA) may establish a sensing process by using another device (an AP) as a proxy. In this case, how a proxy device manages a process of sensing by proxy is an urgent problem to be solved.

To facilitate understanding of the technical solutions in embodiments of this application, the following describes the technical solutions in this application in detail by using specific embodiments. The foregoing related technologies, as optional solutions, may be randomly combined with the technical solutions of embodiments of this application, all of which fall within the protection scope of embodiments of this application. Embodiments of this application include at least a part of the following content.

Figure 8:
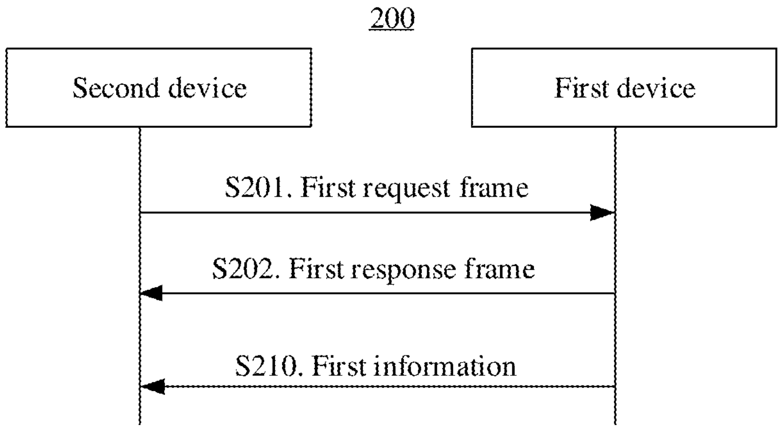
FIG. 8 is a schematic interaction diagram of a sensing method according to an embodiment of this application.

FIG. 8 is a schematic interaction diagram of a sensing method 200 according to an embodiment of this application. As shown in FIG. 8, the method 200 includes the following contents.

S210: A first device transmits first information to a second device. The first information is used to indicate information about a result of establishing a sensing process by the first device, and the sensing process is established by the first device based on a proxy request of the second device.

In embodiments of this application, the first device is also referred to as a sensing by proxy device, or a sensing by proxy responder (SBP responder, or SBP responding STA). In other words, the first device is a sensing proxy, or a sensing initiator supporting a proxy function (SBP capable Sensing Initiator).

In embodiments of this application, the second device is also referred to as a sensing by proxy requester (SBP requester, or a SBP requesting STA). That is, the sensing by proxy requester may request the sensing by proxy device working as a proxy to establish a sensing process.

In some embodiments, the first device may be an AP, and the second device may be a Non-AP STA.

In some other embodiments, the first device and the second device may be different Non-AP STAs.

In some other embodiments, the first device and the second device may be different APs.

In some embodiments, the sensing process includes but is not limited to an establishment process of a measurement setup and/or a measurement process. That is, the first device may act as a proxy for the second device to establish a measurement setup (or referred to as a sensing measurement setup) and/or to perform a measurement process (or referred to as a sensing measurement process).

In some embodiments, the measurement process established by a proxy may be a trigger based (TB) measurement process, or may be a non-trigger based (non-TB) measurement process, which is not limited in this application.

Optionally, in some embodiments, the sensing process may further include a measurement report process.

In some embodiments, the first information is transmitted by using a first report frame.

In embodiments of this application, the first report frame is also referred to as a sensing by proxy report frame (SBP Report), or a proxy report frame, or the like. A name of the frame is not limited in this application.

In some embodiments of this application, the method 200 further includes:

S201. receiving, by the first device, a first request frame transmitted by the second device. The first request frame is used to request the first device working as a proxy to establish a sensing process or a measurement setup.

In some embodiments of this application, the method 200 further includes:

S202. transmitting, by the first device, a first response frame to the second device. The first response frame is used to indicate whether the first device accepts to be a proxy of the second device to establish the sensing process, or in other words, whether the first device accepts a sensing by proxy request (or a proxy request) of the second device.

In some embodiments, the first request frame is also referred to as a sensing by proxy request frame (SBP request) or a proxy request frame, and the first response frame is also referred to as a sensing by proxy response frame (SBP response) or a proxy response frame, or the like. A name of the frame is not limited in this application.

In some embodiments, the first request frame includes requirement information (or referred to as sensing requirement information) of a sensing process requested by the second device to be established by a proxy.

By way of example rather than limitation, the sensing requirement information includes at least one of the following:

a quantity requirement of sensing responders, a frequency requirement of sensing measurements, a bandwidth requirement of sensing measurements, a type of sensing measurement (such as trigger based sensing measurement or non-trigger based sensing measurement), or a manner in which a sensing by proxy device reports measurement results (or referred to as sensing results or sensing measurement results) to a sensing by proxy requester.

In some embodiments, the frequency information of sensing measurements may refer to a quantity of times sensing measurements are performed in a unit time, and the unit time may be 1 second, or 100 milliseconds, or the like, which is not limited in this application.

In some embodiments, the sensing requirement information may include scheduling information of a measurement setup, which is used for scheduling between a plurality of sensing by proxy devices when a sensing by proxy requester establishes a same measurement setup by using the plurality of sensing by proxy devices as proxies.

In some embodiments, the scheduling information of the measurement setups includes measurement start time information and time interval information of measurement instances.

In some embodiments, the measurement start time information may refer to a start time of the first measurement instance belonging to (or using) the measurement setup. For example, the measurement start time information may be a partial timing synchronization function (partial TSF) value of a target time, or an offset value between a target time and a current time. The partial TSF may represent truncated data of a synchronization time value, for example, removing the most significant 38 bits and the least significant 10 bits from 64 bits of a TSF timer.

In some embodiments, the time interval information of measurement instances may refer to a time interval between two measurement instances that are adjacent in a time sequence and belong to (or use) the measurement setup.

In some embodiments, a manner in which a sensing by proxy device reports measurement result(s) to a sensing by proxy requester includes but is not limited to at least one of the following:

- a first reporting manner, used to indicate that a measurement result is reported in a case when a measurement result reported by a sensing signal receiver is received;
- a second reporting manner, used to indicate that, after a measurement instance ends, the measurement result(s) that are received in the measurement instance or before the succeeding measurement instance are reported; or
- a third reporting manner, used to indicate that, after all measurement results of each measurement instance in N measurement instances are obtained, all measurement results of each measurement instance in the N measurement instances are reported, where N is a positive integer.

In some embodiments, N is predefined, for example, N is 1, or 2, or the like.

In some other embodiments, N is indicated by the second device, for example, the second device may indicate N in the first request frame.

In some embodiments of this application, the first information is used to indicate information about a result (or referred to as information about an establishment status) of establishing the sensing process, and/or information about a result of execution (or information about an execution status) of the sensing process.

The following uses a measurement setup process and a measurement process as an example to illustrate a manner of reporting result information of a sensing process.

Embodiment 1: Measurement Setup Process

In some embodiments of this application, the first information includes first indication information. The first indication information is used to indicate information about a result of establishing a measurement setup. For example, the first indication information is used to indicate that the first device, as a proxy of the second device, successfully establishes the measurement setup, or that the first device, as a proxy of the second device, fails to establish the measurement setup.

Case 1: Successfully Establishing a Measurement Setup

In some embodiments, the first information further includes information about a measurement setup that is successfully established.

In some embodiments, the information about a measurement setup that is successfully established may include part or all of measurement setup information carried by the first device when establishing the measurement setup.

In some embodiments, the information about a measurement setup that is successfully established includes at least one of the following:

- frequency information of sensing measurements, quantity information of sensing responders, identifier(s) ID(s) of sensing responder(s), manner(s) in which sensing signal receiver(s) report measurement result(s) to a sensing by proxy device, or information about role(s) of sensing responder(s) in sensing measurement.

In some embodiments, the ID of a sensing responder may include an AID or unassociated ID (UID) of the sensing responder, or may be a MAC address of the sensing responder.

In some embodiments, the manner in which a sensing signal receiver reports a measurement result to a sensing by proxy device may include but not limited to immediate report and delayed report.

In some embodiments, the information about a measurement setup that is successfully established is used to assist a sensing by proxy requester in processing measurement result data. The measurement result data is reported by the sensing signal receiver to the sensing by proxy device, and then further reported by the sensing by proxy device to the sensing by proxy requester.

Case 2: Failing to Establish a Measurement Setup

In some embodiments, the first information further includes information on a cause for failing to establish a measurement setup.

It should be understood that, in embodiments of this application, the information on a cause for failing to establish a measurement setup may refer to any cause that the sensing responder (or a sensing participant) does not meet a sensing requirement of the second device, which is not limited in this application.

In some embodiments, the information on a cause for failing to establish a measurement setup includes but is not limited to at least one of the following:

- a quantity of sensing responders does not meet a sensing requirement of the second device, or a reporting manner of a measurement result of a sensing responder does not meet a sensing requirement of the second device.

In some embodiments, that a quantity of sensing responders does not meet a sensing requirement of the second device may include:

- the quantity of sensing responders does not meet a requirement of a quantity of sensing responders in the foregoing sensing requirement information.

In some embodiments, that a reporting manner of a measurement result of a sensing responder does not meet a sensing requirement of the second device may include:

- the reporting manner of a measurement result of a sensing responder is different from a reporting manner required in the sensing requirement information, or a quantity of sensing responders that meet a reporting manner required in the sensing requirement information is insufficient.

For example, if the second device requires that the reporting manner of a measurement result required in the sensing requirement information is immediate report, but a sensing responder does not support immediate report, or a quantity of sensing responders that support immediate report does not meet the requirement of a quantity of sensing responders. In this case, it may be considered that the reporting manner of a measurement result of a sensing responder does not meet a sensing requirement of the second device.

In some embodiments, in a case in which the sensing responder does not meet the sensing requirement of the second device, the first device initiates a termination procedure of a measurement setup, to terminate an established measurement setup, and/or the first device transmits the first information to the second device, indicating failing to establish a measurement setup and/or a cause for failing to establish a measurement setup.

Optionally, in some embodiments, the first information further includes information about a measurement setup that fails to be established.

In some embodiments, the information about a measurement setup that fails to be established includes at least one of the following:

frequency information of sensing measurements, quantity information of sensing responders, ID(s) of sensing responder(s), manner(s) in which sensing signal receiver(s) report measurement result(s) to a sensing by proxy device, and information about role(s) of sensing responder(s) in sensing measurement.

In some embodiments, the information about a measurement setup that fails to be established may include part or all of measurement setup information carried by the first device during establishment of the measurement setup. For example, measurement setup information that does not meet the sensing requirement of the second device during establishment of the measurement setup may be carried.

In some embodiments, the first information may further include measurement setup information suggested by the first device, which is used to assist the second device in adjusting the sensing requirement information. Optionally, the second device may initiate a proxy request based on the suggested measurement setup information, which is conducive to implementing successful proxy sensing.

Figure 9:
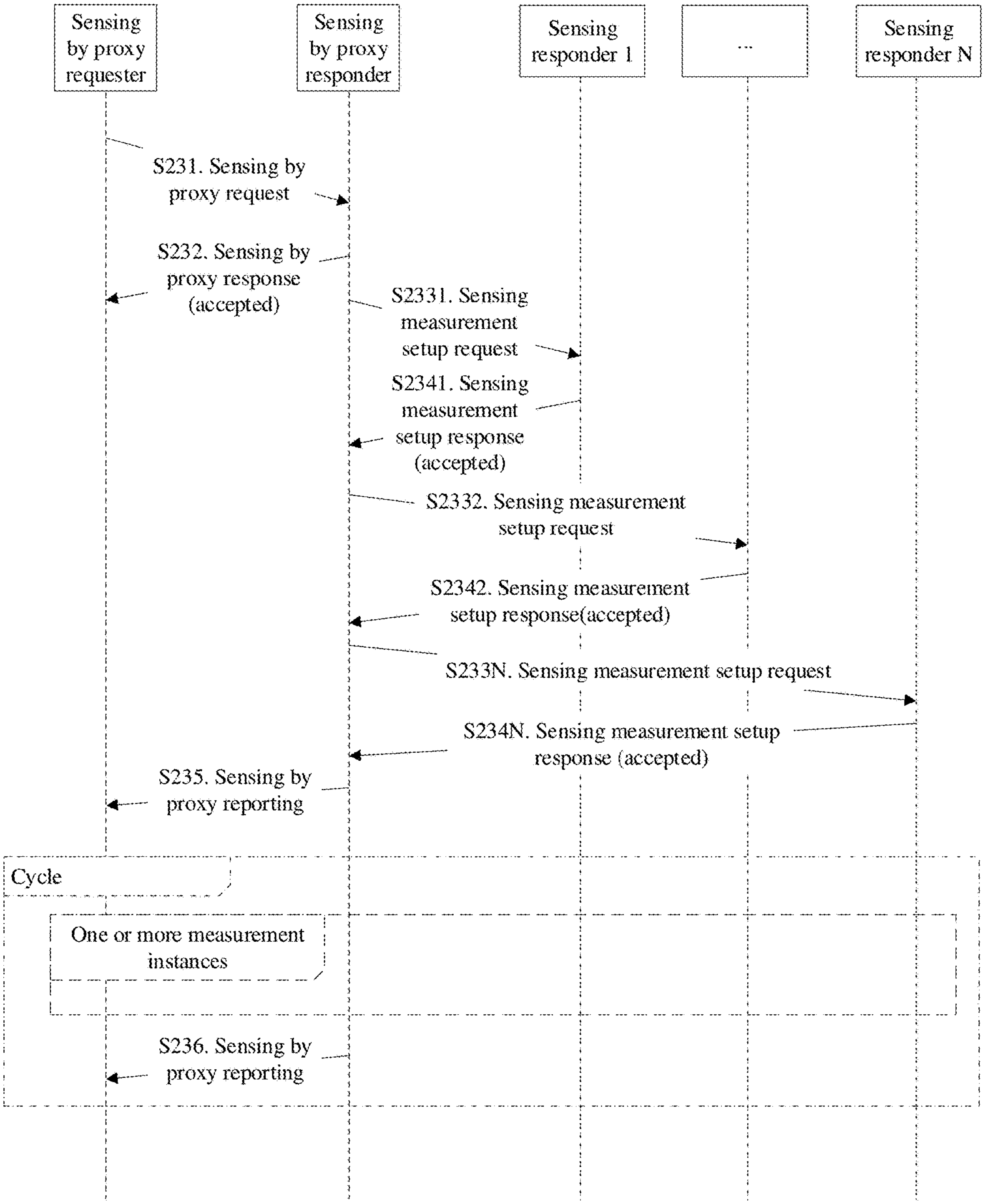
FIG. 9 is a schematic interaction diagram of a sensing by proxy process according to an embodiment of this application.

With reference to FIG. 9, from a perspective of interaction between a sensing by proxy requester, a sensing by proxy responder and sensing responder(s), an overall flowchart of successful sensing by proxy according to an embodiment of this application is described.

As shown in FIG. 9, at least some of the following steps may be included.

S231. A sensing by proxy requester transmits a sensing by proxy request to a sensing by proxy responder. The sensing by proxy request corresponds to the foregoing first request frame, and is used to request the sensing by proxy responder working as a proxy to establish a sensing process or a measurement setup.

Optionally, the sensing by proxy request includes sensing requirement information of the sensing by proxy requester. For specific content, refer to relevant description in foregoing embodiments. Details are not described herein again.

S232. The sensing by proxy responder transmits a sensing by proxy response to the sensing by proxy requester. The sensing by proxy response corresponds to the foregoing first response frame, and is used to indicate whether the sensing by proxy responder accepts the sensing by proxy request of the sensing by proxy requester. In this example, the sensing by proxy responder accepts the sensing by proxy request of the sensing by proxy requester.

Optionally, the sensing by proxy responder generates measurement setup information based on the sensing requirement information carried in the sensing by proxy request.

Further, the sensing by proxy responder may transmit a sensing measurement setup request to at least one sensing responder. The sensing measurement setup request includes a measurement setup requested to be established.

It should be understood that a specific quantity of sensing responders is not limited in this application, for example, there may be one or more sensing responders.

In an example, in S2331 to S233N, the sensing by proxy responder may transmit the sensing measurement setup request to N sensing responders.

Further, the sensing by proxy responder receives a sensing measurement setup response transmitted by at least one sensing responder. The sensing measurement setup response is used to indicate whether the sensing responder accepts the measurement setup requested to be established in the sensing measurement setup request.

In an example, in S2341 to S234N, the N sensing responders each transmit a sensing measurement setup response to the sensing by proxy responder. The sensing measurement setup response is used to indicate that the corresponding sensing responder accepts the measurement setup requested to be established in the sensing measurement setup request.

S235. The sensing by proxy responder transmits a sensing by proxy report frame to the sensing by proxy requester. The sensing by proxy report frame is used to indicate an establishment result of a measurement setup established by a proxy, for example, whether establishment is successful, or a cause of an establishment failure.

In this example, the sensing by proxy report frame includes first information. The first information includes first indication information, and the first indication information is used to indicate that the measurement setup is successfully established.

Optionally, the first information further includes information about the measurement setup that is successfully established. For example, the first information includes part or all of measurement setup information carried in the sensing measurement setup request.

Further, subsequent measurement and a report process may be performed between the sensing by proxy responder and a sensing responder based on the measurement setup that is successfully established.

For example, the sensing by proxy device may receive measurement results of one or more measurement instances transmitted by a sensing responder, and the one or more measurement instances are based on the measurement setup that is successfully established.

Optionally, the one or more measurement instances correspond to one or more measurement setups.

Optionally, a measurement result of each measurement instance in the one or more measurement instances may include a measurement result of at least one sensing signal receiver.

Further, in S236, the sensing by proxy device transmits sensing by proxy report frame(s) to the sensing by proxy requester to report measurement results of the one or more measurement instances.

Figure 10:
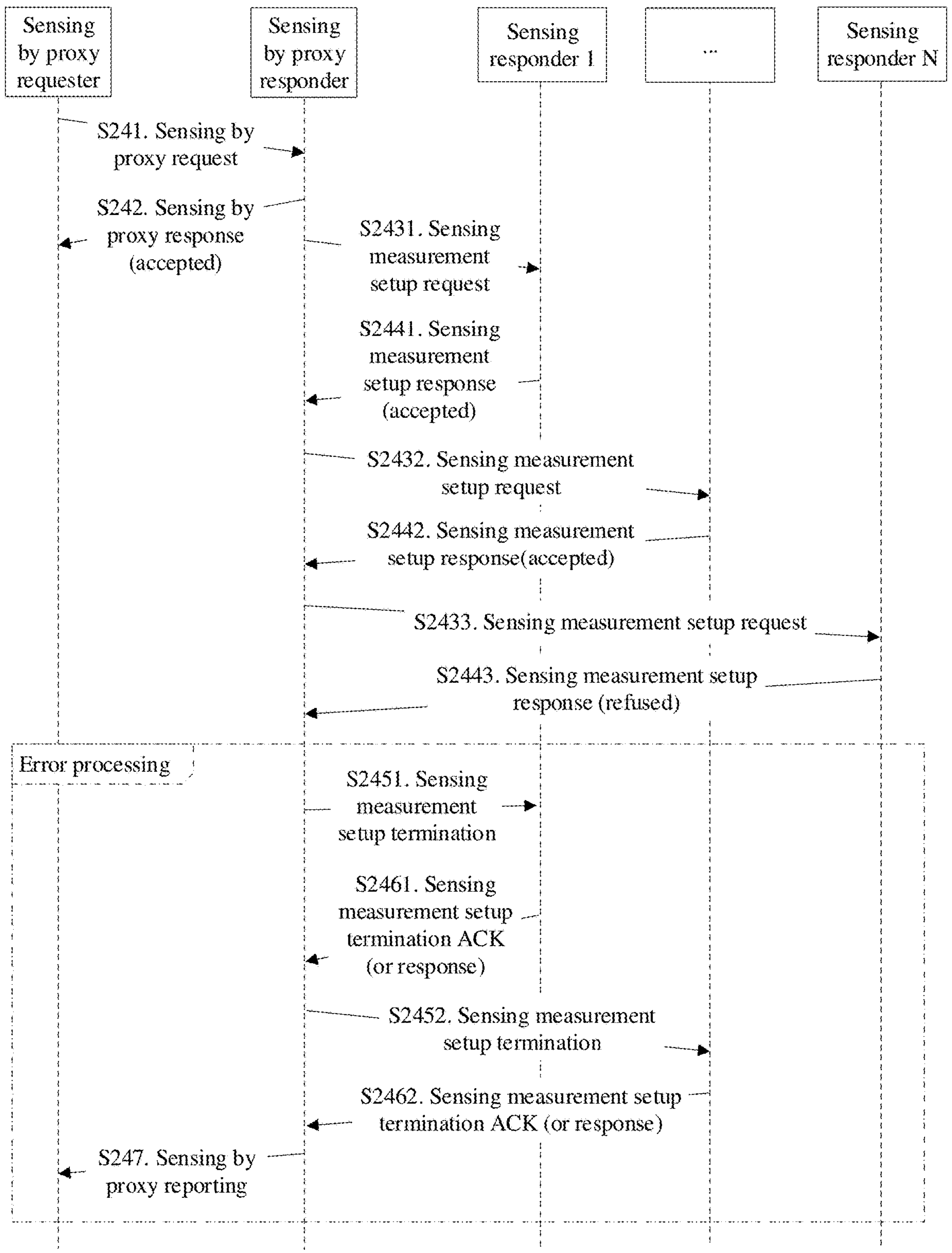
FIG. 10 is a schematic interaction diagram of another sensing by proxy process according to an embodiment of this application.

With reference to FIG. 10, from a perspective of interaction between a sensing by proxy requester, a sensing by proxy responder and sensing responder(s), an overall flowchart of failed sensing by proxy according to an embodiment of this application is described.

As shown in FIG. 10, at least some of the following steps may be included.

S241. A sensing by proxy requester transmits a sensing by proxy request to a sensing by proxy responder. The sensing by proxy request corresponds to the foregoing first request frame, and is used to request the sensing by proxy responder working as a proxy to establish a sensing process or a measurement setup.

Optionally, the sensing by proxy request includes sensing requirement information of the sensing by proxy requester. For specific content, refer to relevant description in foregoing embodiments. Details are not described herein again.

S242. The sensing by proxy responder transmits a sensing by proxy response to the sensing by proxy requester. The sensing by proxy response corresponds to the foregoing first response frame, and is used to indicate whether the sensing by proxy responder accepts the sensing by proxy request of the sensing by proxy requester. In this example, the sensing by proxy responder accepts the sensing by proxy request of the sensing by proxy requester.

Optionally, the sensing by proxy responder generates a measurement setup based on the sensing requirement information carried in the sensing by proxy request.

Further, the sensing by proxy responder may transmit a sensing measurement setup request to at least one sensing responder. The sensing measurement setup request includes the measurement setup requested to be established.

It should be understood that a specific quantity of sensing responders is not limited in this application, for example, there may be one or more sensing responders.

In an example, in S2431 to S243N, the sensing by proxy responder may transmit the sensing measurement setup request to N sensing responders.

Further, the sensing by proxy responder receives a sensing measurement setup response transmitted by at least one sensing responder. The sensing measurement setup response is used to indicate whether the sensing responder accepts a measurement setup requested to be established in the sensing measurement setup request.

In an example, in S2441 to S244N, the N sensing responders each transmit a sensing measurement setup response to the sensing by proxy responder. The sensing measurement setup response is used to indicate whether the corresponding sensing responder accepts a measurement setup requested to be established in the sensing measurement setup request.

In this example, in the N sensing responders, there may be a sensing responder that refuses to establish the measurement setup, resulting in that a quantity of sensing responders does not meet a requirement of the sensing by proxy requester for a quantity of sensing responders.

Further, the sensing by proxy responder initiates a measurement setup termination process.

For example, the sensing by proxy responder transmits a sensing measurement setup termination frame to a sensing responder that accepts the sensing measurement setup request, to instruct to terminate the established measurement setup.

Optionally, the sensing measurement setup termination frame includes an identity of the measurement setup to be terminated.

As an example, in S2451 and S2452, the sensing by proxy responder may transmit a sensing measurement setup termination frame to a sensing responder 1 and a sensing responder 2 to instruct to terminate the established measurement setup.

Furthermore, the sensing by proxy responder receives a sensing measurement setup termination response (ACK) transmitted by the sensing responder. The sensing measurement setup termination response is used to indicate that the sensing responder acknowledges that the measurement setup is terminated.

In an example, in S2461 and S2462, a sensing responder 1 and a sensing responder 2 each transmit a sensing measurement setup termination response to the sensing by proxy responder, to indicate that the corresponding sensing responder acknowledges that the measurement setup is terminated.

S247. The sensing by proxy responder transmits a sensing report frame to the sensing by proxy requester. The sensing report frame includes first information, which is used to indicate failing to establish a measurement setup and/or a cause for failing to establish a measurement setup, for example, a quantity of sensing responders does not meet the sensing requirement of the sensing by proxy requester.

Embodiment 2: Measurement Process

In some embodiments, the first information includes second indication information, and the second indication information is used to indicate an execution result of the measurement process. The measurement process is corresponding to a measurement setup established by the first device working as a proxy of the second device, that is, the measurement process is executed based on the measurement setup.

In some embodiments, the execution result of the measurement process may alternatively be expressed as an execution result of a measurement instance.

For example, the second indication information is used to indicate that the measurement process is successfully executed (in other words, no error occurs in the measurement process, the measurement instance is successfully executed, or no error occurs in the measurement instance), or an error occurs in the measurement process (in other words, execution of the measurement process fails, execution of the measurement instance fails, or an error occurs in the measurement instance).

In some embodiments, the first information further includes an error code and/or error information for an error occurring in the measurement process.

In some embodiments, the error code for an error occurring in the measurement process may alternatively be expressed as information on a cause of the error occurring in the measurement process, or information on a cause of failing to execute the measurement process, or the like.

It should be understood that an error occurring in the measurement process may be caused when the sensing responder does not meet a sensing requirement of the second device, or may be caused because of the sensing by proxy device, which is not limited in this application.

In some embodiments, the error code for an error occurring in the measurement process is used to indicate at least one of the following:

a sensing requirement of the second device is not met due to a decrease in a quantity of sensing participants in the measurement process, a sensing requirement of the second device is not met due to a change in an operating mode (OM) of a sensing participant in the measurement process, or a load of a basic service set (BSS) exceeds a preset threshold (that is, the load of the BSS is too high).

In some scenarios, when a STA has insufficient power but wants to extend operation, the operating mode is changed (reducing a bandwidth and/or reducing a quantity of transmit spatial flows that can be supported and/or reducing a quantity of receive spatial flows that can be supported) to achieve an effect of extending operation duration. After the operating mode changes, the sensing process may be affected. For example, the less the bandwidth, the larger a quantization error of the measurement result, and the less a quantity of spatial flows, a lower CSI matrix dimension of the measurement result, thereby reducing sensing accuracy. When an operating mode of a sensing responder (for example, a non-AP STA) changes, the sensing responder transmits, to a sensing initiator (for example, an AP), an operating mode notification (OMN) (which may be an OMN frame, or may be another frame carrying an OMN element) or an operating mode indication (OMI) (which may be an operating mode control subfield (OM Control subfield) and/or an EHT operating mode control subfield (EHT OM Control subfield)).

In some embodiments, the error information for an error occurring in the measurement process may refer to relevant information occurred when the error occurs.

For example, when an error occurs in the measurement process due to a decrease in a quantity of sensing participants, the error information may be a quantity of sensing participants required to be added, or a quantity of sensing participants after the decrease.

For another example, when an error occurs in the measurement process due to a change of the operating mode of a sensing participant, the error information may be an operating mode of the sensing responder after the change.

For another example, when an error occurs in the measurement process because a load of a BSS exceeds a preset threshold, the error information may be a current load of the BSS.

In some embodiments of this application, a measurement setup identity space (Measurement Setup ID space) may be divided into a first measurement setup identity space and a second measurement setup identity space, which are respectively used to identify a measurement setup corresponding to a measurement setup established according to a proxy request and a measurement setup corresponding to a measurement setup established not according to a proxy request. The first measurement setup identity space and the second measurement setup identity space are different from each other, which is conducive to simplifying implementation and quick search.

By way of example rather than limitation, the measurement setup identity space includes integer values from 0 to 31, the first measurement setup identity space includes integer values from 16 to 31, and the second measurement setup identity space includes integer values from 0 to 15.

It should be understood that the measurement setup identity space, and the division manner of the first measurement setup identity space and the second measurement setup identity space are only examples. The measurement setup identity space may alternatively be another value range, and the first measurement setup identity space and the second measurement setup identity space may alternatively use another division manner, as long as the first measurement setup identity space and the second measurement setup identity space do not overlap, which is not limited in this application.

In some embodiments, the sensing by proxy device may record information (including but not limited to the information in following tables) about a measurement setup to be established in two tables depending on whether the measurement setup is established according to a sensing by proxy request, as shown in Table 1 and Table 2 below. Table 1 is used to record information about a measurement setup established according to a proxy request. Table 2 is used to record information about a measurement setup established not according to a proxy request.

TABLE 1

| Sensing by proxy requester ID | Measurement setup ID | Sensing signal transmitter ID | Sensing signal receiver ID | Sensing procedure type | Sensing result type |
|---|---|---|---|---|---|
| 1 | 16 | 0, 2, 3, 4 | 0, 2, 5 | 0 | 0 |
| 1 | 17 | 0 | 6 | 0 | 0 |
| 4 | 18 | 0 | 5 | 1 | 0 |

TABLE 2

| Measurement setup ID | Sensing signal transmitter ID | Sensing signal receiver ID | Sensing procedure type | Sensing result type |
|---|---|---|---|---|
| 0 | 3, 100 | 0, 5, 100 | 0 | 0 |
| 1 | 0, 7 | 0, 7 | 1 | 0 |

As shown in Table 1, a sensing by proxy requester 1 (an associated device, for example, a device ID is AID, and its value is 1) requests a sensing by proxy device 0 (an AID value is 0) to establish two measurement setups, a value of the measurement setup ID for one measurement setup is 16, and a value of the measurement setup ID for the other measurement setup is 17. Both use a trigger based measurement procedure (for example, a value of the sensing procedure type is 0). A sensing by proxy requester 4 (an AID value is 4) requests the sensing by proxy device 0 (the AID value is 0) to establish a measurement setup, a value of the measurement setup ID is 18, which uses a non-trigger based measurement procedure (for example, a value of the sensing procedure type is 1). The sensing result types of the three measurement setups are all CSI (indicated by a type value 0).

In the measurement setup 16, the device 0 and a device 2 are both sensing signal transmitters and sensing signal receivers, a device 3 is only a sensing signal transmitter, and a device 5 is only a sensing signal receiver.

In the measurement setup 17, the device 0 is only a sensing signal transmitter, and a device 6 is only a sensing signal receiver.

In the measurement setup 18, the device 0 is only a sensing signal transmitter, and the device 5 is only a sensing signal receiver.

As shown in Table 2, the sensing by proxy device 0 establishes two measurement setups that use no proxy, a value of the measurement setup ID for one measurement setup is 0, and a value of the measurement setup ID for the other measurement setup is 1. The two procedures are respectively a trigger based measurement procedure (for example, a value of the sensing procedure type is 0) and a non-trigger based measurement procedure (for example, a value of the sensing procedure type is 1). The sensing result types of the two measurement setups are both CSI (indicated by a type value 0).

In the measurement setup 0, a device 100 is both a sensing signal transmitter and a sensing signal receiver, a device 3 is only a sensing signal transmitter, and a device 5 is only a sensing signal receiver.

In the measurement setup 1, the device 0 and a device 7 are both sensing signal transmitters and sensing signal receivers.

In some embodiments of this application, the method 200 further includes:

if the second device is a sensing signal receiver of a first measurement setup, determining, by the first device depending on whether a first measurement instance is shared by another measurement setup that is different from the first measurement setup, whether to trigger the second device to report a measurement result.

For example, if the first measurement instance is not shared by another measurement setup that is different from the first measurement setup, it is determined that the second device is not triggered to report the measurement result, that is, the measurement result of the first measurement instance does not need to be reported to another sensing by proxy requester, and therefore, the second device may not be triggered to report the measurement result.

For another example, if the first measurement instance is shared by another measurement setup that is different from the first measurement setup, but the measurement result of the second device is only used by the second device, it is determined that the second device is not triggered to report the measurement result.

In other words, if a sensing by proxy requester, also as a sensing signal receiver, participates in one or more measurement setups established according to a sensing by proxy request transmitted by the sensing by proxy requester, and a measurement result of the sensing by proxy requester is not used by any measurement setup that is different from the one or more sensing measurement setups, then during or after a measurement reporting phase of the measurement instance of the one or more measurement setups, the sensing by proxy device does not request the sensing by proxy requester to report a measurement result of a corresponding measurement instance.

This is described with reference to a specific example shown in FIG. 11.

Figure 11:
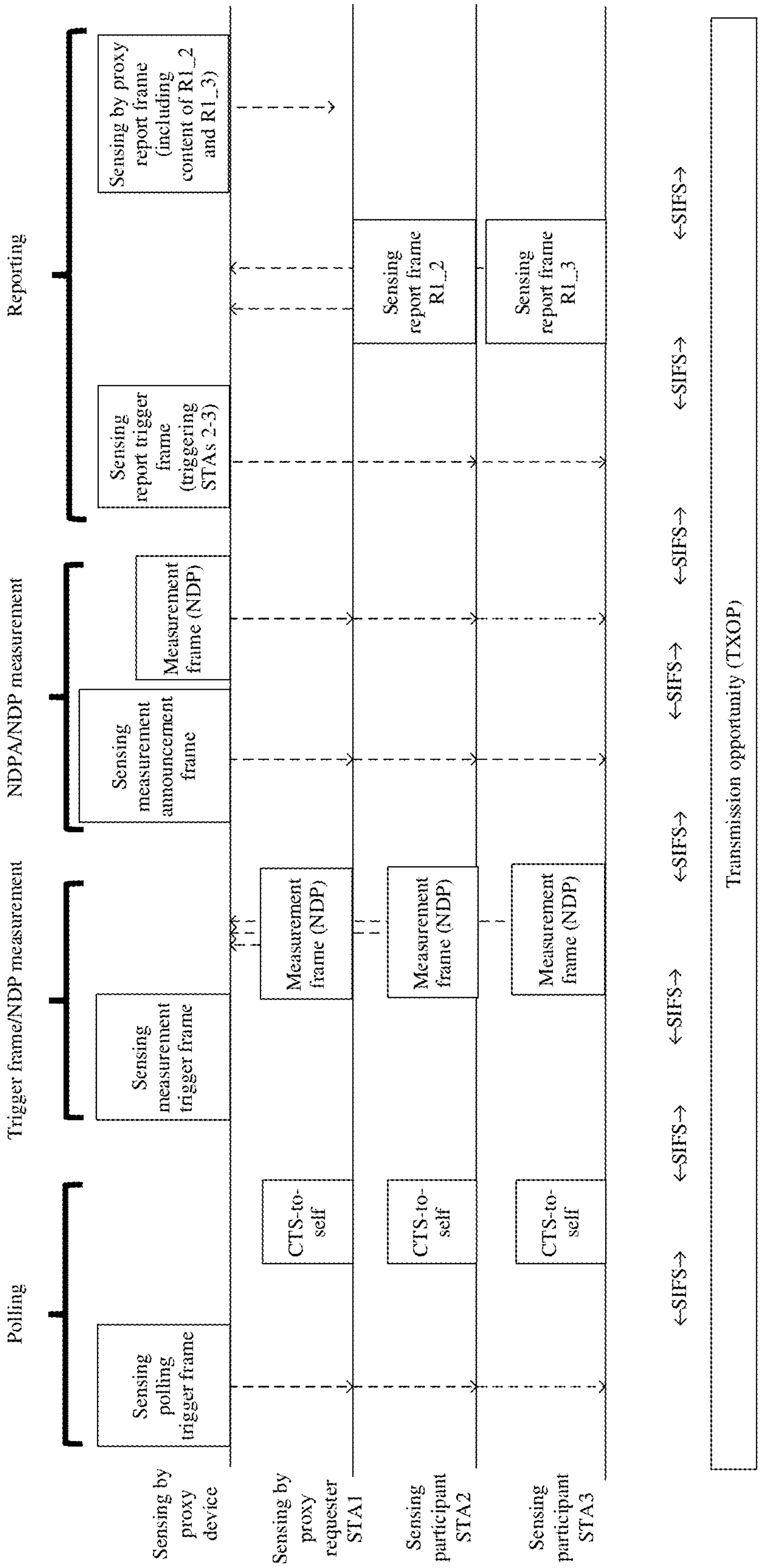
FIG. 11 is a schematic diagram of triggering reporting according to an embodiment of this application.

As shown in FIG. 11, a sensing by proxy requester (for example, a STA1) requests a sensing by proxy device (for example, an AP) to establish a measurement setup M6. A trigger based measurement instance G is independent, non-shared, and is only used by the measurement setup M6. In this measurement instance G, the STA1 also participates in downlink measurement as a sensing signal receiver. In this case, in the reporting phase, in order to reduce a network load, the sensing by proxy device may not request the STA1 to report a measurement result of measurement instance G, for example, triggering of the STA1 is not indicated in a sensing report trigger frame.

For another example, a sensing initiator (for example, an AP) establishes a measurement setup M7, and a sensing by proxy requester (for example, a STA1) requests a sensing by proxy device (for example, an AP) to establish a measurement setup M8. For the measurement setup M7, a STA2 and a STA3 each are required to report a measurement result, and for the measurement setup M8, the STA1, the STA2, and the STA3 each are required to report a measurement result. A trigger based measurement instance H is shared and used by the measurement setup M7 and the measurement setup M8. In this measurement instance H, the STA1 also participates in downlink measurement as a sensing signal receiver. Because only the measurement setup M8 requires the measurement result of the STA1, in order to reduce a network load during the reporting phase, the sensing by proxy device may not request the STA1 to report a measurement result of the measurement instance H, for example, triggering of the STA1 is not indicated in a sensing report trigger frame.

The following describes design of a frame format of a first report frame that carries first information. However, this application is not limited thereto.

In some embodiments, the first report frame may be an action frame or an action no acknowledgment frame (Action No Ack).

That is, a function of reporting information about a result of establishing a sensing process by a proxy may be implemented by using an action frame or an action no acknowledgment frame.

In some embodiments, an existing action frame type (for example, a public action frame type) may be used to carry the information about a result of establishing a sensing process by a proxy, or a new action frame type (for example, a protected sensing action frame type (Protected Sensing Action Frames)) may be added to carry the information about a result of establishing a sensing process by a proxy. For example, a sensing action frame may be defined, and the sensing action frame is used to carry the information about a result of establishing a sensing process by a proxy.

Figure 12:
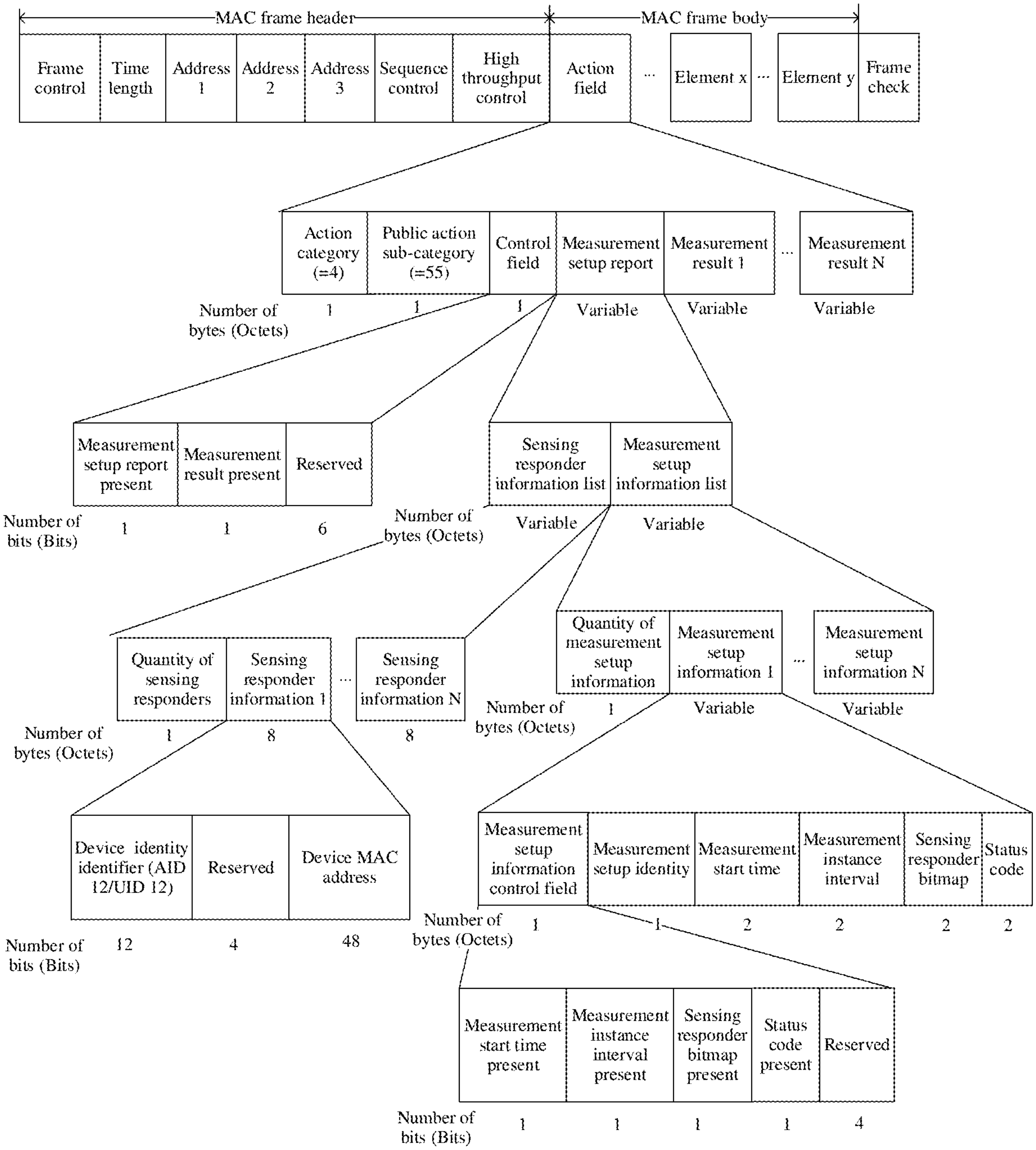
FIG. 12 is a schematic diagram of a format of a sensing by proxy report frame according to an embodiment of this application.

FIG. 12 is a schematic diagram of a format of a first report frame implemented by using a public action frame according to this application.

It should be understood that a location and a length of each field in the frame format shown in FIG. 12 are merely examples, and may be flexibly adjusted according to actual needs or content that is carried, and this application is not limited thereto.

It should also be understood that a correspondence between a value and meaning of each field described below is only an example, as long as each value corresponds to a unique meaning, and this application is not limited thereto.

As shown in FIG. 12, an action field (Action field) of the first report frame includes the following fields:

an action category (Category) field, for example, if a value is 4, it indicates that the action frame is a public action frame (Public Action Frames); and a public action sub-category (Public Action Field) field, for example, if a value is a reserved value (any value from 46 to 255, with 55 being used as an example), it indicates that the public action frame is a sensing by proxy report frame (SBP Report frame).

In some embodiments, as shown in FIG. 12, the first report frame includes a status code (Status Code) field, which is used to indicate information about a result of establishing a measurement setup (for example, whether establishment is successful, or a cause of an establishment failure) or information about an execution result of a measurement process (for example, whether execution is successful, or a cause of an execution failure).

In some embodiments, the status code field may be a subfield of an action field of a public action frame. A specific location of the status code field in the action field is only an example, and this application is not limited thereto.

In this case, measurement setups may not be distinguished in the status code field, that is, measurement setups corresponding to all measurement setup information fields below correspond to same information about an establishment result or same information about an execution result of a measurement process. Alternatively, the measurement setups may be distinguished. For example, information about a result of establishing a measurement setup or information about an execution result of a measurement process corresponding to each measurement setup information field in the first report frame may be indicated in a bitmap manner.

In some other embodiments, the status code field may be a subfield of the measurement setup information field described below.

That is, the status code field may be a granularity of a measurement setup, for example, indicating information about a result of establishing a corresponding measurement setup or information about an execution result of a measurement process corresponding to the measurement setup.

Optionally, the status code field is set to 0, indicating success (or that no error occurs). The success herein may refer to that a measurement setup is successfully established, or a measurement process is successfully executed, or no error occurs in the measurement process.

Optionally, the status code field is set to a value that is different from 0, indicating a failure (or an error occurs).

Optionally, the status code field may alternatively indicate information on a cause for failing to establish a measurement setup and/or information on a cause of an error occurring in a measurement process.

By way of example rather than limitation, if the status code field is set to 131, it indicates that a measurement setup fails to be established due to insufficient quantity of sensing participants; if the status code field is set to 132, it indicates that a measurement setup fails to be established because a sensing participant fails to immediately report a sensing result; if the status code field is set to 133, it indicates that a requirement of a minimum quantity of sensing responders cannot be met due to a decrease in a quantity of sensing participants participated in measurement in a measurement process; if the status code field is set to 134, it indicates that an established measurement setup cannot be maintained due to a change in an OM of a sensing responder in a measurement process; and if the status code field is set to 135, it indicates that a load of a BSS is high and a sensing measurement needs to be stopped.

In some embodiments, as shown in FIG. 12, the first report frame further includes a measurement setup report field for indicating information about a measurement setup that is successfully established or information about a measurement setup that fails to be established.

In some embodiments, the measurement setup report field may be a subfield of the action field of the public action frame. A specific location of the measurement setup report field in the action field is only an example, and this application is not limited thereto.

In some embodiments, the measurement setup report field includes a sensing responder list field and/or a measurement setup list field, the sensing responder list field is used to indicate at least one sensing responder participating in establishment of a measurement setup, and the measurement setup list field is used to indicate information about a measurement setup that is successfully established, or information about a measurement setup that fails to be established.

In some embodiments, as shown in FIG. 12, the sensing responder list field may include at least one of the following fields:

- a sensing responder quantity field, used to indicate a quantity of sensing responders included in the sensing responder list field; or
- at least one sensing responder field, used to indicate at least one sensing responder.

In some embodiments, as shown in FIG. 12, the sensing responder field includes at least one of the following fields:

- a device identity identifier field, used to indicate an AID or UID of a sensing responder; or
- a device MAC address field, used to indicate a MAC address of a sensing responder.

In some embodiments, as shown in FIG. 12, the measurement setup list field includes at least one measurement setup information (Measurement Setup Info) field, which is used to indicate scheduling information and/or device information of an established measurement setup.

In some embodiments, the measurement setup information field includes at least one of the following fields:

- a measurement setup identity field, used to indicate a measurement setup that is successfully established or fails to be established;
- a measurement start time (Measurement Start Time) field, used to indicate a start time of the first measurement instance of a measurement setup indicated in the measurement setup identity field;
- a measurement instance interval (Measurement Instance Interval) field, used to indicate a time interval between two measurement instances that are adjacent in a time sequence of a measurement setup indicated in the measurement setup identity field; or
- a sensing responder bitmap field, used to indicate whether a sensing responder indicated in the sensing responder list field is used as a sensing participant of a measurement setup corresponding to a measurement setup identity.

In some embodiments, a measurement setup identity indicated in the measurement setup identity field belongs to a first measurement setup identity space.

In some embodiments, the measurement start time field may be set to a partial TSF value of a target time, or an offset value between a target time and a current time.

Optionally, the measurement instance interval field is set to 0, indicating a reserved value; or set to 0, indicating that there is no fixed interval.

Optionally, a unit of the interval may be 100 microseconds. For example, if a value of the measurement instance interval field is 1, it indicates 100 microseconds; if the value is 2, it indicates 200 microseconds, and so on.

Optionally, the unit of the interval may be 1 millisecond. For example, if a value of the measurement instance interval field is 1, it indicates 1 millisecond; if the value is 2, it indicates 2 milliseconds, and so on.

In some embodiments, each bit in a sensing responder bitmap corresponds to a sensing responder at a corresponding location in the foregoing sensing responder information list. For example, the first bit in the sensing responder bitmap indicates the first sensing responder information in the sensing responder information list, the second bit indicates the second sensing responder information, and so on.

In an embodiment, if a sensing responder participates in a sensing measurement corresponding to a measurement setup, a bit corresponding to the sensing responder in the sensing responder bitmap is set to 1, otherwise the bit is set to 0.

In another embodiment, if a sensing responder participates in sensing measurement corresponding to a measurement setup, a bit corresponding to the sensing responder in the sensing responder bitmap is set to 0, otherwise the bit is set to 1.

In some embodiments, as shown in FIG. 12, the measurement setup information field further includes a measurement setup information control (Control) field, which is used to indicate whether one or more subsequent fields present.

In some embodiments, the measurement setup information control field includes at least one of the following fields:

- a measurement start time present (Measurement Starting Time Present) field, used to indicate whether the measurement start time field presents in the measurement setup information field, where in one embodiment, if this field is set to 1, it indicates yes; if this field is set to 0, it indicates no; and in another embodiment, if this field is set to 0, it indicates yes; if this field is set to 1, it indicates no;
- a measurement instance interval present (Measurement Instance Interval Present) field, used to indicate whether the measurement instance interval field presents in the measurement setup information field, where in one embodiment, if this field is set to 1, it indicates yes; if this field is set to 0, it indicates no; and in another embodiment, if this field is set to 0, it indicates yes; if this field is set to 1, it indicates no;
- a sensing responder bitmap present (Responder Bitmap Present) field, used to indicate whether the sensing responder bitmap field presents in the measurement setup information field. where in one embodiment, if this field is set to 1, it indicates yes; if this field is set to 0, it indicates no; and in another embodiment, if this field is set to 0, it indicates yes; if this field is set to 1, it indicates no; or a status code present field, used to indicate whether a status code field presents in the measurement setup information field, where in one embodiment, if this field is set to 1, it indicates yes; if this field is set to 0, it indicates no; and in another embodiment, if this field is set to 0, it indicates yes; if this field is set to 1, it indicates no.

In some embodiments, as shown in FIG. 12, the action field of the first report frame may further include a control field, which is used to indicate whether one or more subsequent fields present.

For example, the control field may include a measurement setup report present field, which is used to indicate whether the first report frame includes the measurement setup report field.

In one embodiment, if the measurement setup report present field is set to 1, it indicates yes; if the measurement setup report present field is set to 0, it indicates no.

In another embodiment, if the measurement setup report present field is set to 0, it indicates yes; if the measurement setup report present field is set to 1, it indicates no.

In some embodiments of this application, the first report frame is further used for the sensing by proxy device to report a measurement result of the sensing signal receiver to the sensing by proxy requester.

For example, the first report frame further includes at least one measurement result field, which is used to carry the measurement result reported by the sensing signal receiver.

In some embodiments, the control field may include a measurement result present field, used to indicate whether the first report frame includes a measurement result field.

In one embodiment, if the measurement result present field is set to 1, it indicates yes; if the measurement result present field is set to 0, it indicates no.

In another embodiment, if the measurement result present field is set to 0, it indicates yes; if the measurement result present field is set to 1, it indicates no.

Figure 13:
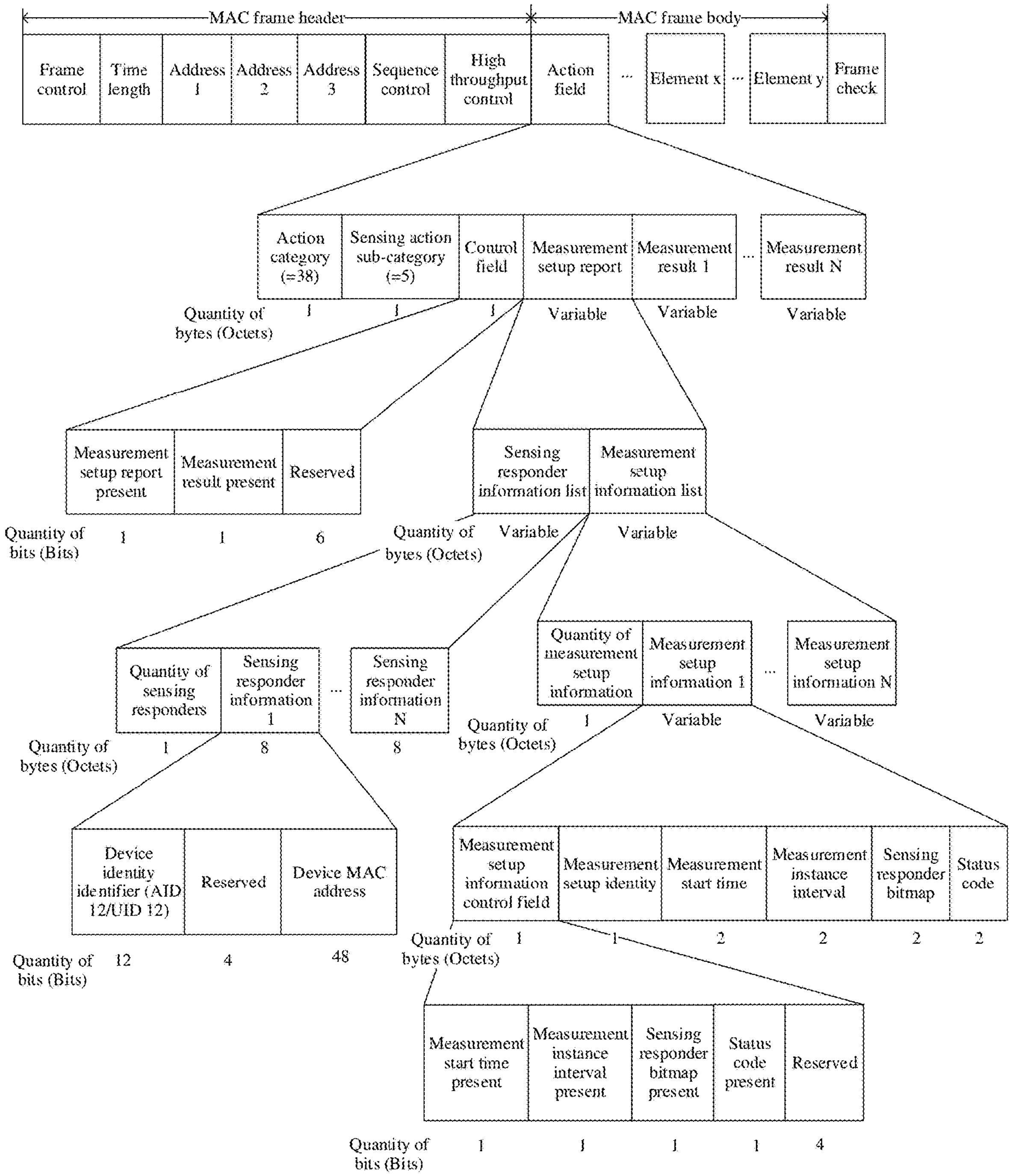
FIG. 13 is a schematic diagram of a format of another sensing by proxy report frame according to an embodiment of this application.

FIG. 13 is a schematic diagram of a format of a first report frame implemented by using a newly defined sensing action frame according to an embodiment of this application.

It should be understood that a location and a length of each field in the frame format shown in FIG. 13 are merely examples, and may be flexibly adjusted according to actual needs or content that is carried, and this application is not limited thereto.

It should also be understood that a correspondence between a value and meaning of each field described below is only an example, as long as each value corresponds to a unique meaning, and this application is not limited thereto.

As shown in FIG. 13, an action field (Action field) of the first report frame includes the following fields:

an action category (Category) field, for example, if a value is a reserved value (for example, 38), it indicates that the action frame is a newly defined protected sensing action frame (Protected Sensing Action Frames); or a sensing action sub-category (Sensing Action Field) field, for example, if a value is a reserved value (any value from 0 to 255, with 5 being used as an example), it indicates that the sensing action frame is a sensing by proxy report frame (SBP Report frame).

It should be understood that the meaning of each field in the frame format shown in FIG. 13 is the same as the meaning of a corresponding field in the frame format shown in FIG. 12. For detailed description, refer to the relevant description of FIG. 12, which will not be repeated herein.

In conclusion, a sensing by proxy device may report, to a sensing by proxy requester, information about a result of establishing a sensing process by a proxy, such as information about an establishment result of a measurement setup established by the proxy, or information on a cause for an establishment failure; or information about an execution result of a measurement process established by the proxy, such as whether an execution is successful, whether an error occurs in an execution process, or a cause of an error occurred.

Furthermore, optionally, the sensing by proxy requester may adjust requested sensing requirement information according to information reported by the sensing by proxy device, which is conducive to achieving successful proxy sensing and improving user experience.

Figure 14:
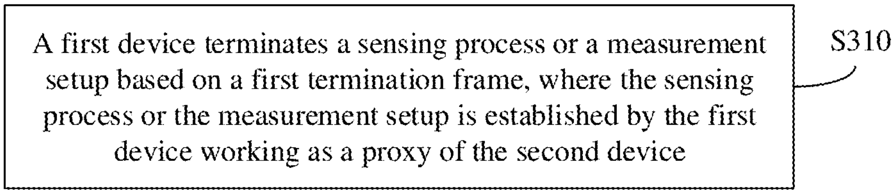
FIG. 14 is a schematic diagram of another sensing method according to an embodiment of this application.

FIG. 14 is a schematic interaction diagram of another sensing method 300 according to an embodiment of this application. The sensing method 300 is a termination procedure of a sensing by proxy process.

Optionally, the sensing by proxy process may be terminated based on an explicit request, for example, terminated based on a termination request of a sensing by proxy device, or terminated based on a termination request of a sensing by proxy requester; or the sensing by proxy process may be terminated implicitly, for example, terminated automatically when a survival time (or a duration period) of the sensing process exceeds a specific time length.

It should be understood that the method 300 and the method 200 may be implemented independently, or may be implemented in combination. For example, in a case that execution of the sensing process in the method 200 is completed, the sensing process is terminated based on the termination process described in the method 300, or in a case that an error occurs in the sensing process in the method 200, the sensing process is terminated based on the termination process described in the method 300, and this application is not limited thereto.

The following describes termination manners of the sensing by proxy process with reference to Embodiment 3 and Embodiment 4, respectively.

Embodiment 3

As shown in FIG. 14, the method 300 includes the following contents.

S310. A first device terminates a sensing process or a measurement setup based on a first termination frame. The sensing process or the measurement setup is established by the first device working as a proxy of a second device, and the first termination frame is used to instruct to terminate the sensing process or the measurement setup.

For specific implementations of the first device, the second device, and the sensing by proxy process, refer to the relevant description in the method 200. For brevity, details are not described herein again.

In some embodiments, the first termination frame is also referred to as a sensing by proxy termination frame (SBP termination), or a proxy termination frame, or the like. A name of the frame is not limited in this application.

In some embodiments, the first termination frame is used to instruct to terminate the sensing process or the measurement setup, which may also be expressed as that the first termination frame is used to terminate a sensing by proxy request (or a proxy request) of the second device.

In some embodiments, the first termination frame may be transmitted by the second device to the first device. That is, the second device may transmit the first termination frame to the first device to terminate a sensing by proxy process, or to terminate a measurement setup of a proxy, or to terminate a sensing by proxy request of the second device.

In some other embodiments, the first termination frame may alternatively be transmitted by the first device to the second device. That is, the first device may transmit the first termination frame to the second device to terminate a sensing by proxy process, or to terminate a measurement setup of a proxy, or to terminate a sensing by proxy request of the second device.

In summary, a termination process of the sensing by proxy process or the measurement setup may be initiated by a sensing by proxy device, or may be initiated by a sensing by proxy requester.

In some embodiments, the first termination frame may be transmitted at any phase, for example, in a case that the measurement setup is successfully established, or in a case that the measurement setup fails to be established, or in a case that an error occurs in a measurement process, or in a case that the measurement process is successfully executed, or after a measurement report, or the like, and this application is not limited thereto.

As an example, in a case that a load of a BSS exceeds a preset threshold, the first device may transmit the first termination frame to terminate the sensing process, or terminate the measurement setup established by a proxy.

As an example, the second device may transmit the first termination frame to the first device to terminate the sensing process in a case of expecting to change sensing requirement information.

In some embodiments, the first termination frame includes a measurement setup identity corresponding to a measurement setup to be terminated. Optionally, the measurement setup identity belongs to the first measurement setup identity space in the method 200.

In some embodiments, the first termination frame further includes information on a cause for terminating the sensing process or the measurement setup.

In some embodiments, the information on a cause for terminating the sensing process or the measurement setup may include foregoing information on a cause for failing to establish the measurement setup, or may include foregoing an error code and/or error information for an error occurring in the measurement process.

In some embodiments of this application, the first device may initiate a termination procedure of the sensing process or measurement setup based on the first termination frame. For example, the termination procedure of the measurement setup shown in steps S2451 to S2462 in FIG. 10 is initiated.

In some scenarios, a plurality of sensing by proxy requesters may request a same sensing by proxy device to establish a measurement setup, that is, the first device may serve as a sensing by proxy device of a plurality of sensing by proxy requesters.

In this case, when sensing requirements of the sensing by proxy requesters are the same or similar, the sensing by proxy device may share an established measurement setup with the plurality of sensing by proxy requesters. The shared measurement setup may be initiated by the sensing by proxy device, or may be initiated by the sensing by proxy device according to sensing by proxy requests of the sensing by proxy requesters.

In some other embodiments of this application, the first device determines, depending on whether a measurement setup to be terminated is shared by another sensing process, whether to terminate the measurement setup, where the another sensing process is a sensing process established by the first device based on a proxy request of another sensing by proxy requester.

For example, if the measurement setup to be terminated is shared by another sensing process, and the measurement setup is not terminated in the another sensing process (in other words, the measurement setup is still used in the another sensing process), the first device does not terminate the measurement setup.

For another example, if the measurement setup to be terminated is not shared by another sensing process, the first device terminates the measurement setup.

For example, in a home, a power management system (for example, running on a STA1) cares whether there is anyone in a room (for example, it needs to perform measurement once every 20 milliseconds and report a measurement result), and if there is no one in the room, turns off a light to save energy; and an audio system (for example, running on a STA2) cares about a location of people in the room (for example, it needs to perform measurement once every 10 milliseconds and report a measurement result). In this way, the audio system may direct a sound to an orientation of people, thereby improving user experience.

Figure 15:
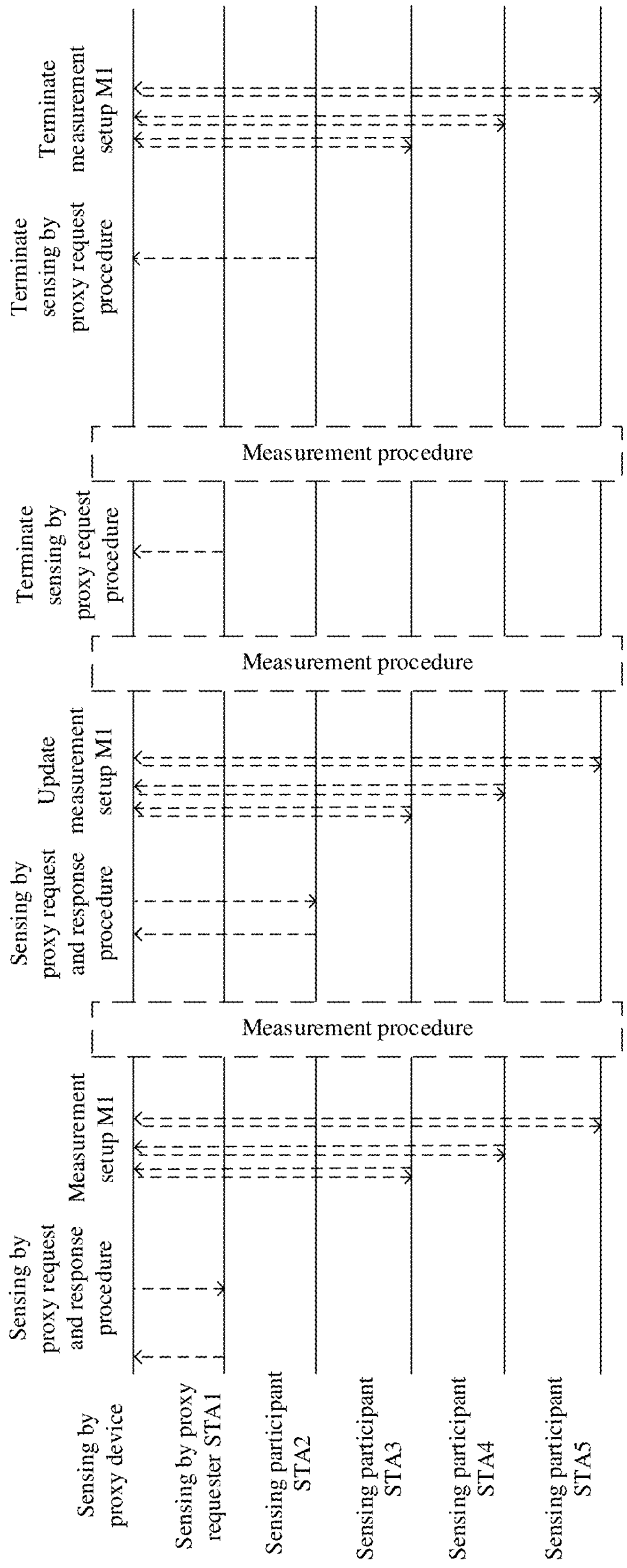
FIG. 15 is a schematic diagram of a termination procedure of a sensing by proxy process according to an embodiment of this application.

In some embodiments, as shown in FIG. 15, a STA1 first requests a sensing by proxy device (for example, an AP) to establish a measurement setup, and the AP establishes a measurement setup M1 with sensing participants STA3, STA4, and STA5 according to a proxy request of the STA1.

Then a STA2 also requests the sensing by proxy device to establish a measurement setup. Frequency information of sensing measurement in the measurement setup M1 does not meet a sensing requirement of the STA2. In this case, the AP interacts with the STA3, the STA4, and the STA5 to update a setting of the measurement setup M1 (for example, update a measurement frequency from 50 times per second to 100 times per second) to meet the sensing requirement of the STA2. Sharing the updated measurement setup M1 with the sensing process requested by the STA2, which is equivalent to using the updated measurement setup M1 for both the sensing process requested by the STA1 and the sensing process requested by the STA2.

Further, after receiving a measurement result reported by a sensing signal receiver, the sensing by proxy device may transmit data of the measurement result to all sensing by proxy requesters corresponding to the sensing process to which the measurement setup M1 is applied, such as the STA1 and the STA2.

At a moment, the STA1 transmits a first termination frame to the sensing by proxy device to terminate the sensing process requested by the STA1, but the STA2 does not request to terminate the sensing process requested by the STA2, that is, the measurement setup M1 is still used by the sensing process requested by the STA2. In this case, the sensing by proxy device does not terminate the measurement setup M1. After a period of time, if the STA2 also requests to terminate the sensing process requested to be established by the STA2, then the sensing by proxy device terminates the measurement setup M1.

Figure 16:
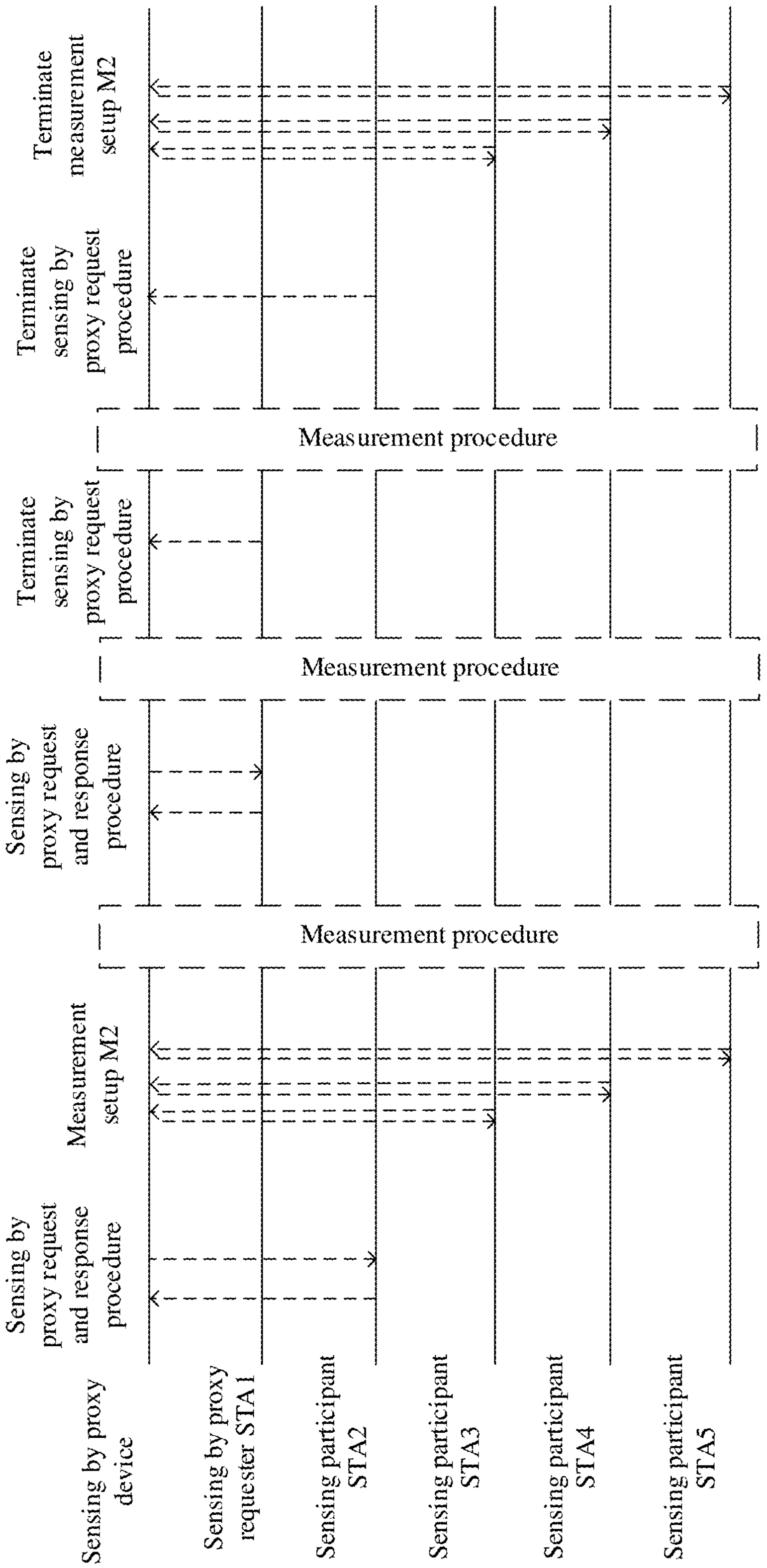
FIG. 16 is a schematic diagram of a termination procedure of a sensing by proxy according to another embodiment of this application.

In some other embodiments, as shown in FIG. 16, a STA2 first requests a sensing by proxy device (for example, an AP) to establish a measurement setup, and the AP establishes a measurement setup M2 with a STA3, a STA4, and a STA5 according to a proxy request of the STA2 (a measurement frequency of the measurement setup M2 is 100 times per second). Then a STA1 may request the sensing by proxy device to establish a measurement setup. The measurement setup M2 can meet a sensing requirement of the STA1. Therefore, the sensing by proxy device may share the measurement setup M2 with a sensing process requested to be established by the STA1.

Further, after receiving a measurement result reported by a sensing signal receiver, the sensing by proxy device may transmit data of the measurement result to all sensing by proxy requesters corresponding to the sensing process to which the measurement setup M2 is applied, such as the STA1 and the STA2.

At a moment, the STA1 transmits a first termination frame to the sensing by proxy device to terminate the sensing process requested by the STA1, but the STA2 does not request to terminate the sensing process requested by the STA2, that is, the measurement setup M2 is still used by a sensing process requested by the STA2. In this case, the sensing by proxy device does not terminate the measurement setup M2. After a period of time, if the STA2 also requests to terminate the sensing process requested to be established by the STA2, then the sensing by proxy device terminates the measurement setup M2.

The following describes design of a frame format of the first termination frame. However, this application is not limited thereto.

In some embodiments, the first termination frame may be an action (Action) frame or an action no acknowledgment frame (Action No Ack). In other words, a function of terminating a sensing by proxy process or a measurement setup may be implemented by using an action frame or an action no acknowledgment frame.

In some embodiments, an existing action frame type (for example, a public action frame type) may be used to terminate a sensing by proxy process or a measurement setup, or a new action frame type (for example, a protected sensing action frame type (Protected Sensing Action Frames)) may be added to terminate a sensing by proxy process or a measurement setup. For example, a sensing action frame may be defined, and the sensing action frame is used to terminate a sensing by proxy process or a measurement setup.

Figure 17:
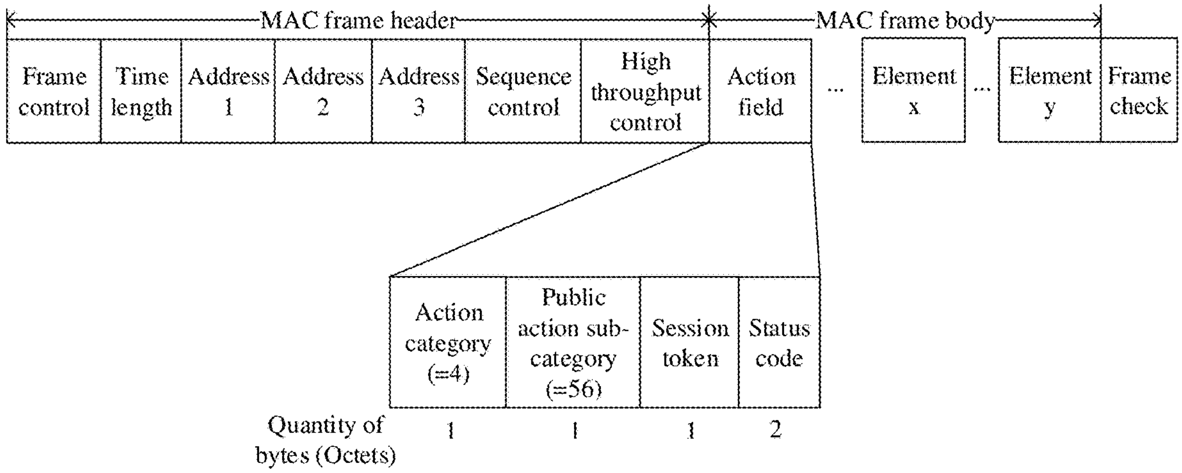
FIG. 17 is a schematic diagram of a format of a sensing by proxy termination frame according to an embodiment of this application.

FIG. 17 is a schematic diagram of a format of a first termination frame implemented by using a public action frame according to this application.

It should be understood that a location and a length of each field in the frame format shown in FIG. 17 are merely examples, and may be flexibly adjusted according to actual needs or content that is carried, and this application is not limited thereto.

It should also be understood that a correspondence between a value and meaning of each field described below is only an example, as long as each value corresponds to a unique meaning, and this application is not limited thereto.

As shown in FIG. 17, an action field (Action field) of the first termination frame includes the following fields:

- an action category (Category) field, for example, if a value is 4, it indicates that the action frame is a public action frame (Public Action Frames); or
- a public action sub-category (Public Action Field) field, for example, if a value is a reserved value (any value from 46 to 255, with 56 being used as an example), it indicates that the public action frame is a sensing by proxy termination frame.

In some embodiments, the first termination frame includes a session token field, and the session token field is used to indicate a sensing process to be terminated, or an identity of a measurement setup to be terminated.

In an embodiment, a value of the session token field is the same as a value of a session token field in a sensing by proxy request frame transmitted by the second device and/or a value of a session token field in a sensing by proxy response frame transmitted by the first device.

In another embodiment, the session token field may carry an identity of a measurement setup to be terminated corresponding to a sensing by proxy request to be terminated. Optionally, the identity of the measurement setup belongs to a first measurement setup identity space.

In some embodiments, the first termination frame further includes a status code field for indicating information on a cause for terminating the sensing process or information on a cause for terminating the measurement setup.

By way of example rather than limitation, if the status code field is set to 0, it indicates that no cause is indicated; if the status code field is set to 133, it indicate that a requirement of a minimum quantity of sensing responders cannot be met due to a decrease in a quantity of sensing participants participated in measurement in a measurement process; if the status code field is set to 134, it indicates that an established measurement setup cannot be maintained due to a change in an OM of a sensing responder in a measurement process; or if the status code field is set to 135, it indicates that a load of a BSS is high and a sensing measurement needs to be stopped.

Figure 18:
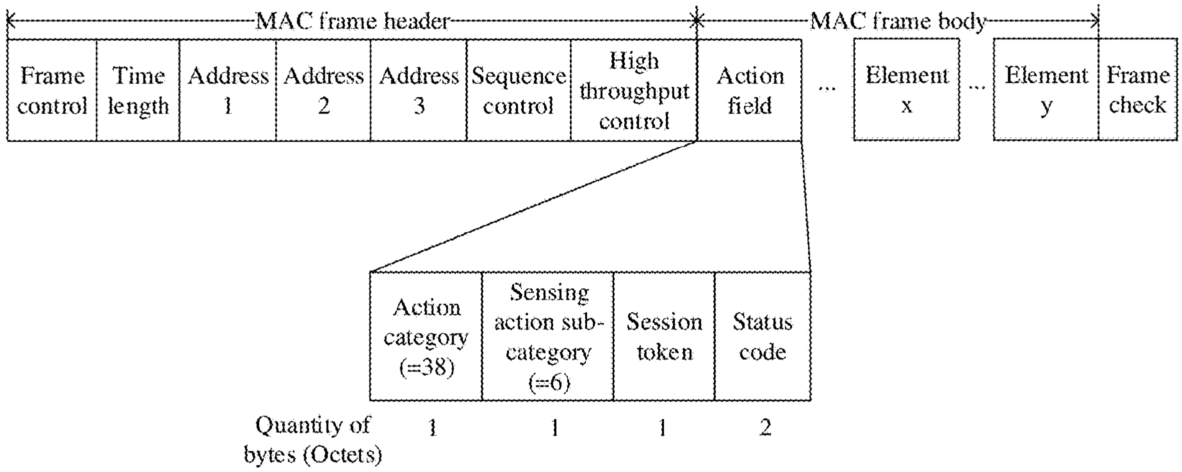
FIG. 18 is a schematic diagram of a format of another sensing by proxy termination frame according to an embodiment of this application.

FIG. 18 is a schematic diagram of a format of a first termination frame implemented by a newly defined sensing action frame according to an embodiment of this application.

It should be understood that a location and a length of each field in the frame format shown in FIG. 18 are merely examples, and may be flexibly adjusted according to actual needs or content that is carried, and this application is not limited thereto.

It should also be understood that a correspondence between a value and meaning of each field described below is only an example, as long as each value corresponds to a unique meaning, and this application is not limited thereto.

As shown in FIG. 18, an action field (Action field) of the first termination frame includes the following fields:

- an action category (Category) field, for example, if a value is a reserved value (for example, 38), it indicates that the action frame is a newly defined protected sensing action frame (Protected Sensing Action Frames); or
- a sensing action sub-category (Sensing Action Field) field, for example, if a value is a reserved value (any value from 0 to 255, with 6 being used as an example), it indicates that the sensing action frame is a sensing by proxy termination frame (SBP Termination frame).

It should be understood that the meaning of each field in the frame format shown in FIG. 18 is the same as the meaning of a corresponding field in the frame format shown in FIG. 17. For detailed description, refer to the relevant description of FIG. 17, which will not be repeated herein.

In some other embodiments of this application, the first termination frame may use a same frame format as the foregoing sensing by proxy request frame and sensing by proxy response frame.

Figure 19:
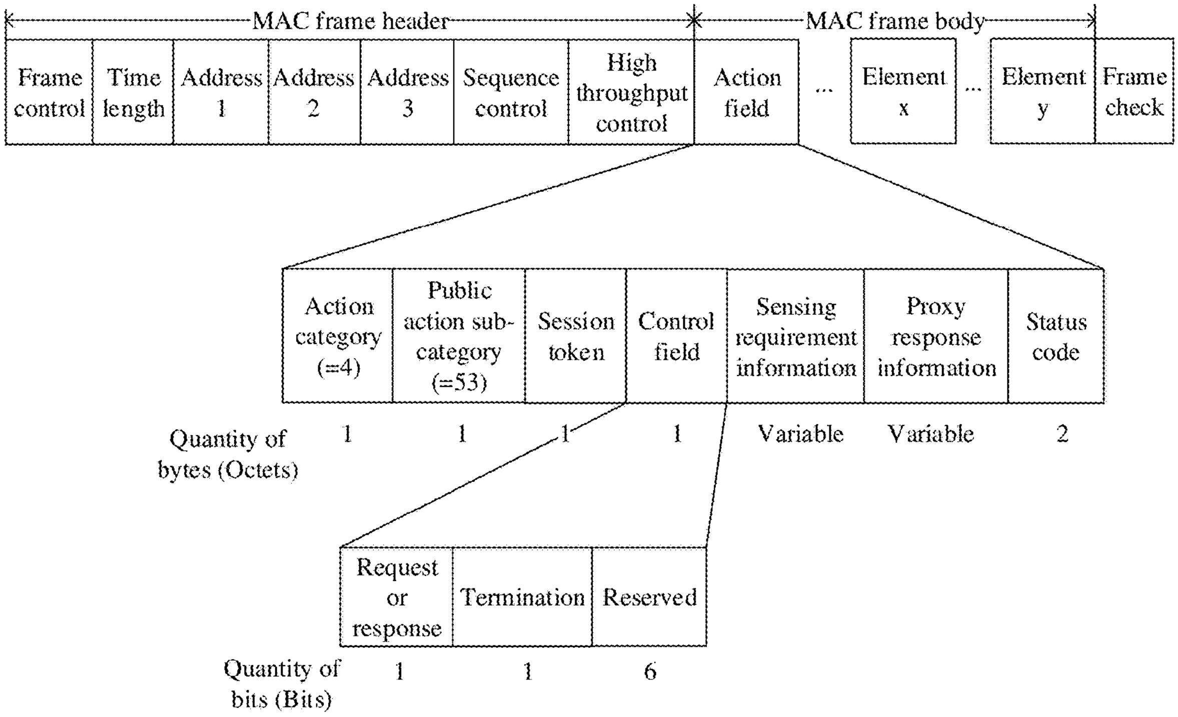
FIG. 19 is a schematic diagram of a format of yet another sensing by proxy termination frame according to an embodiment of this application.

FIG. 19 is a schematic diagram of a format of a first termination frame implemented by using a public action frame according to this application. The format of the frame is also applicable to the foregoing sensing by proxy request frame and sensing by proxy response frame, and a difference lies in that values of some fields are different.

It should be understood that a location and a length of each field in the frame format shown in FIG. 19 are merely examples, and may be flexibly adjusted according to actual needs or content that is carried, and this application is not limited thereto.

It should also be understood that a correspondence between a value and meaning of each field described below is only an example, as long as each value corresponds to a unique meaning, and this application is not limited thereto.

As shown in FIG. 19, an action field (Action field) of the first termination frame includes the following fields:

an action category (Category) field, for example, if a value is 4, it indicates that the action frame is a public action frame (Public Action Frames); or a public action sub-category (Public Action Field) field, for example, if a value is a reserved value (any value from 46 to 255, with 53 being used as an example), it indicates that the public action frame is a sensing by proxy frame.

In some embodiments, the first termination frame includes a termination indication field for indicating whether the sensing by proxy frame is used for a proxy to terminate a sensing process or a measurement setup.

In some embodiments, the first termination frame includes a session token field, and when the termination indication field is used to instruct to terminate a sensing process or a measurement setup, the session token field is used to indicate an identity of a sensing process or measurement setup to be terminated.

In an embodiment, a value of the session token field is the same as a value of a session token field in a sensing by proxy request frame transmitted by the second device and/or a value of a session token field in a sensing by proxy response frame transmitted by the first device.

In another embodiment, the session token field may carry an identity of a measurement setup to be terminated corresponding to a sensing by proxy request. Optionally, the identity of the measurement setup belongs to a first measurement setup identity space.

In some embodiments, the first termination frame further includes a status code field, and when the termination indication field is used to instruct to terminate a sensing process or a measurement setup, the status code field is used to indicate information on a cause for terminating the sensing process or information on a cause for terminating the measurement setup. For a specific implementation, refer to the relevant description of the status code field in FIG. 17. For brevity, details are not described herein again.

In some embodiments, the first termination frame further includes a control (Control) field, which is used to indicate a type of the sensing by proxy frame and presence of a related field. Optionally, the foregoing termination indication field may be set in the control field.

Optionally, the control field is set in the action field of the public action frame.

In some embodiments, the control field further includes a request or response (Request/Response) indication field, which indicates that the sensing by proxy frame is a sensing by proxy request frame or a sensing by proxy response frame.

In one embodiment, if a request or response field is set to 1, it indicates a sensing by proxy request frame; if the request or response field is set to 0, it indicates a sensing by proxy response frame.

In another embodiment, if the request or response field is set to 0, it indicates a sensing by proxy request frame, if the request or response field is set to 1, it indicates a sensing by proxy response frame.

In some embodiments, the action field further includes at least one of the following fields:

a sensing requirement information (Sensing Requirement) field: used to indicate information about a request of a sensing by proxy requester for a measurement setup requested to be established by a proxy, namely, sensing requirement information, where when the request or response indication field in the control field indicates that the sensing by proxy frame is a sensing by proxy request frame, the sensing requirement information field presents, otherwise the sensing requirement information field does not present; or a proxy response information (Proxy Response) field: used to indicate a response of a sensing by proxy device to the sensing by proxy request, for example, whether to accept, or a cause for rejection, or an identity of a measurement setup to be established, where when the request or response indication field in the control field indicates that the sensing by proxy frame is a sensing by proxy response frame, the proxy response information field presents, otherwise the proxy response information field does not present.

Figure 20:
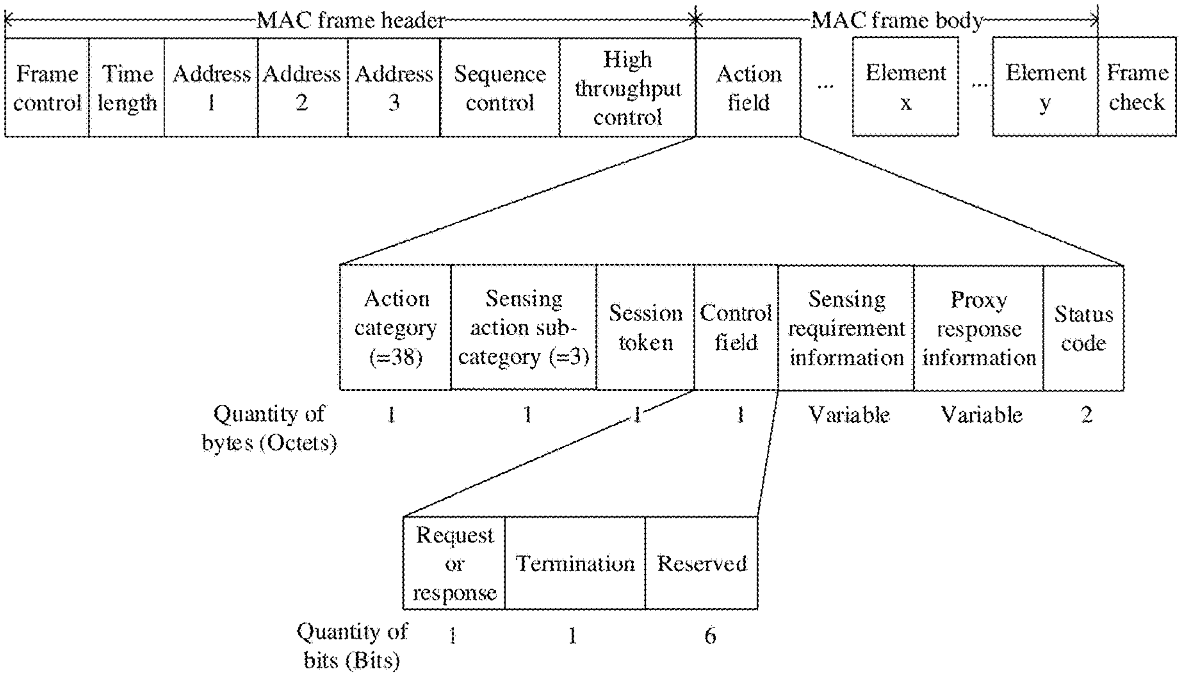
FIG. 20 is a schematic diagram of a format of still another sensing by proxy termination frame according to an embodiment of this application.

FIG. 20 is a schematic diagram of a format of a first termination frame implemented by a newly defined sensing action frame according to an embodiment of this application. The format of the frame is also applicable to the foregoing sensing by proxy request frame and sensing by proxy response frame, and a difference lies in that values of some fields are different.

It should be understood that a location and a length of each field in the frame format shown in FIG. 20 are merely examples, and may be flexibly adjusted according to actual needs or content that is carried, and this application is not limited thereto.

It should also be understood that a correspondence between a value and meaning of each field described below is only an example, as long as each value corresponds to a unique meaning, and this application is not limited thereto.

As shown in FIG. 20, an action field (Action field) of the first termination frame includes the following fields:

an action category (Category) field, for example, if a value is a reserved value (for example, 38), it indicates that the action frame is a newly defined protected sensing action frame (Protected Sensing Action Frames); or a sensing action sub-category (Sensing Action Field) field, for example, if a value is a reserved value (any value from 0 to 255, with 3 being used as an example), it indicates that the sensing action frame is a sensing by proxy frame (SBP frame).

It should be understood that the meaning of each field in the frame format shown in FIG. 20 is the same as the meaning of a corresponding field in the frame format shown in FIG. 19. For detailed description, refer to the relevant description of FIG. 19, which will not be repeated herein.

Embodiment 4

Figure 21:
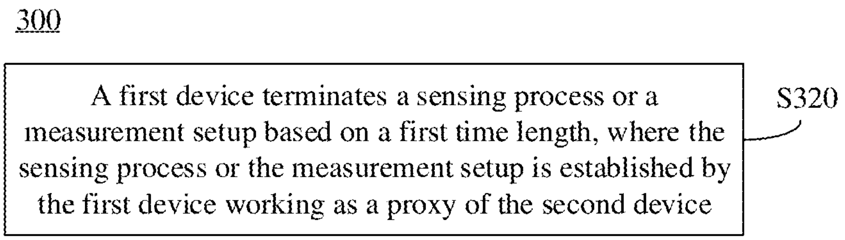
FIG. 21 is a schematic diagram of yet another sensing method according to an embodiment of this application.

In some other embodiments of this application, as shown in FIG. 21, the method 300 further includes:

S320. terminating, by the first device, a sensing by proxy process or a measurement setup based on a first time length.

Optionally, the first time length may be a survival time length, or a duration period, of the sensing by proxy process.

In some embodiments, the first time length is predefined or indicated by the second device.

For example, the first time length is transmitted by the second device by using a first request frame, and the first request frame is used to request the first device working as a proxy to establish the sensing process or the measurement setup.

That is, when the sensing by proxy requester requests to establish a sensing process, it may indicate a survival time length of the sensing process. When a survival time of the sensing process exceeds the time length, the sensing process is automatically terminated.

In conclusion, in the embodiment of this application, the sensing by proxy device or the sensing by proxy requester may terminate the sensing process or measurement setup established by a proxy by using the first termination frame, or may terminate the sensing process when the survival time of the sensing process exceeds the first time length, thereby improving the sensing by proxy process.

The foregoing describes method embodiments of this application in detail with reference to FIG. 8 to FIG. 21. The following describes apparatus embodiments of this application in detail with reference to FIG. 22 to FIG. 26. It should be understood that the apparatus embodiments are corresponding to the method embodiments. For similar descriptions, refer to the method embodiments.

Figure 22:
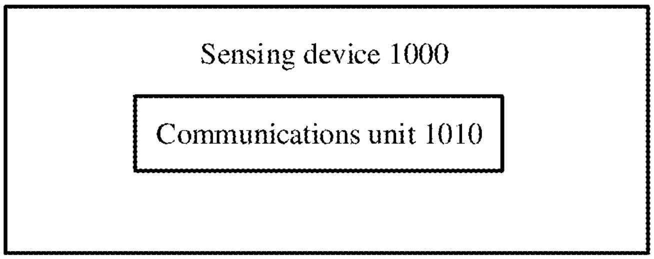
FIG. 22 is a schematic block diagram of a sensing device according to an embodiment of this application.

FIG. 22 is a schematic block diagram of a sensing device according to an embodiment of this application. A sensing device 1000 in FIG. 22 includes:

a communications unit 1010, configured to transmit first information to a second device, where the first information is used to indicate information about a result of establishing a sensing process by the sensing device, the sensing process includes an establishment process of a measurement setup and/or a measurement process, and the sensing process is established by the sensing device based on a proxy request of the second device.

In some embodiments, the first information includes first indication information, and the first indication information is used to indicate a result of establishing a measurement setup by the sensing device working as a proxy of the second device.

In some embodiments, the first indication information is used to indicate that the sensing device, as a proxy of the second device, successfully establishes the measurement setup, or that the sensing device, as a proxy of the second device, fails to establish the measurement setup.

In some embodiments, the first information further includes information about a measurement setup that is successfully established.

In some embodiments, the information about a measurement setup that is successfully established includes at least one of the following:

frequency information of sensing measurements, quantity information of sensing responders, or ID(s) of sensing responder(s).

In some embodiments, the first information further includes information on a cause for failing to establish a measurement setup.

In some embodiments, the information on a cause for failing to establish a measurement setup includes at least one of the following:

a quantity of sensing responders does not meet a sensing requirement of the second device, or a reporting manner of a measurement result of a sensing responder does not meet a sensing requirement of the second device.

In some embodiments, the first information includes second indication information, where the second indication information is used to indicate an execution result of the measurement process.

In some embodiments, the second indication information is used to indicate that the measurement process is successfully executed, or that an error occurs in the measurement process.

In some embodiments, the first information further includes an error code and/or error information for an error occurring in the measurement process.

In some embodiments, the error code for an error occurring in the measurement process is used to indicate at least one of the following: a sensing requirement of the second device is not met due to a decrease in a quantity of sensing participants in the measurement process, a sensing requirement of the second device is not met due to a change in an operating mode of a sensing participant in the measurement process, or a load of a basic service set BSS exceeds a preset threshold.

In some embodiments, the sensing process or the measurement setup is terminated based on a first termination frame, and the first termination frame is used to instruct to terminate the sensing process or the measurement setup.

In some embodiments, the first termination frame is transmitted by the sensing device, or the first termination frame is transmitted by the second device.

In some embodiments, the sensing device further includes:

a processing unit, configured to determine, based on the first termination frame and depending on whether a measurement setup to be terminated is shared by another sensing process, whether to terminate the measurement setup, where the another sensing process is a sensing process established by the sensing device working as a proxy based on another proxy request.

In some embodiments, the processing unit is further configured to: in a case in which the measurement setup to be terminated is shared by another sensing process and the measurement setup is not terminated in the another sensing process, skip terminating the measurement setup; or in a case in which the measurement setup to be terminated is not shared by another sensing process, terminate the measurement setup.

In some embodiments, the first termination frame is a public action frame.

In some embodiments, the first termination frame includes an action category field and a public action sub-category field, the action category field is used to indicate that an action frame is a public action frame, and a value of the public action sub-category field is a reserved value for indicating that the public action frame is used to terminate a sensing process.

In some embodiments, the first termination frame is a sensing action frame.

In some embodiments, the first termination frame includes an action category field and a sensing action sub-category field, a value of the action category field is a reserved value for indicating that an action frame is a sensing action frame, and the sensing action sub-category field is used to indicate that the sensing action frame is used to terminate a sensing process.

In some embodiments, the first termination frame includes a session token field, and the session token field is used to indicate a sensing process to be terminated, or an identity of a measurement setup to be terminated.

In some embodiments, the first termination frame further includes a status code field for indicating information on a cause for terminating the sensing process or information on a cause for terminating the measurement setup.

In some embodiments, the first termination frame includes an action category field and a public action sub-category field, the action category field is used to indicate that an action frame is a public action frame, and a value of the public action sub-category field is a reserved value for indicating that the public action frame is a sensing by proxy frame.

In some embodiments, the first termination frame includes an action category field and a sensing action sub-category field, a value of the action category field is a reserved value for indicating that an action frame is a sensing action frame, and the sensing action sub-category field is used to indicate that the sensing action frame is a sensing by proxy frame.

In some embodiments, the first termination frame includes a termination indication field, and the termination indication field is used to indicate whether the sensing by proxy frame is used for a proxy to terminate a sensing process.

In some embodiments, the first termination frame includes a session token field, and the session token field is used to indicate a sensing process to be terminated, or an identity of a measurement setup to be terminated.

In some embodiments, the sensing process or the measurement setup is terminated when a survival time exceeds a first time length.

In some embodiments, the first time length is predefined or indicated by the second device.

In some embodiments, the first time length is transmitted by the second device by using a first request frame, and the first request frame is used to request the sensing device working as a proxy to establish at least one measurement setup.

In some embodiments, the sensing device further includes:

a processing unit, configured to: in a case in which the second device is a sensing signal receiver of a first measurement setup, determine, depending on whether a first measurement instance is shared by another measurement setup that is different from the first measurement setup, whether to trigger the second device to report a measurement result.

In some embodiments, the processing unit is specifically configured to:

in a case in which the first measurement instance is not shared by another measurement setup that is different from the first measurement setup, determine not to trigger the second device to report the measurement result;

in a case in which the first measurement instance is shared by another measurement setup that is different from the first measurement setup, but the measurement result of the second device is only used by the second device, determine not to trigger the second device to report the measurement result.

In some embodiments, the first information is transmitted by using a first report frame.

In some embodiments, the first report frame is an action frame.

In some embodiments, the first report frame includes a status code field, and the status code field is used to indicate an establishment result of the measurement setup or an execution result of the measurement process.

In some embodiments, the first report frame includes a measurement setup report field for indicating information about a measurement setup that is successfully established.

In some embodiments, the measurement setup report field includes a sensing responder list field and a measurement setup list field, the sensing responder list field is used to indicate at least one sensing responder participating in a measurement setup, and the measurement setup list field is used to indicate information about a measurement setup that is successfully established.

In some embodiments, the measurement setup list field includes at least one measurement setup information field, and each measurement setup information field includes at least one of the following fields:

a measurement setup identity field, used to indicate a measurement setup that is successfully established;

a measurement start time field, used to indicate information about a start time for a measurement;

a measurement instance interval field, used to indicate a time interval between adjacent measurement instances; or a sensing responder bitmap field, used to indicate whether a sensing responder indicated in the sensing responder list field is used as a sensing participant of a measurement setup corresponding to the measurement setup identity.

In some embodiments, the measurement setup identity indicated in the measurement setup identity field belongs to a first measurement setup identity space, and the first measurement setup identity space is used for a measurement setup established due to a proxy request.

Optionally, in some embodiments, the foregoing communications unit may be a communications interface or a transceiver, or an input/output interface of a communications chip or a system-on-chip.

It should be understood that the sensing device 1000 according to the embodiment of this application may correspond to the first device or the sensing by proxy device in method embodiments of this application, and the foregoing and other operations and/or functions of units in the sensing device 1000 are respectively used to implement corresponding procedures of the first device or the sensing by proxy device in method embodiments shown in FIG. 8 to FIG. 21. For brevity, details are not described herein again.

Figure 23:
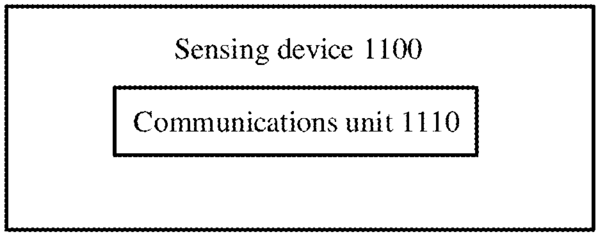
FIG. 23 is a schematic block diagram of another sensing device according to an embodiment of this application.

FIG. 23 is a schematic block diagram of a sensing device according to an embodiment of this application. A sensing device 1100 in FIG. 23 includes:

a communications unit 1110, configured to receive first information transmitted by a first device, where the first information is used to indicate information about a result of establishing a sensing process by the first device, the sensing process includes an establishment process of a measurement setup and/or a measurement process, and the sensing process is established by the first device based on a proxy request of a second device.

In some embodiments, the first information includes first indication information, and the first indication information is used to indicate an establishment result of establishing a measurement setup by the first device working as a proxy of the second device.

In some embodiments, the first indication information is used to indicate that the first device, as a proxy of the second device, successfully establishes the measurement setup, or that the first device, as a proxy of the second device, fails to establish the measurement setup.

In some embodiments, the first information further includes information about a measurement setup that is successfully established.

In some embodiments, the information about a measurement setup that is successfully established includes at least one of following: frequency information of sensing measurements, quantity information of sensing responders, or ID(s) of sensing responder(s).

In some embodiments, the first information further includes information on a cause for failing to establish a measurement setup.

In some embodiments, the information on a cause for failing to establish a measurement setup includes at least one of the following: a quantity of sensing responders does not meet a sensing requirement of the second device, or a reporting manner of a measurement result of a sensing responder does not meet a sensing requirement of the second device.

In some embodiments, the first information includes second indication information, where the second indication information is used to indicate an execution result of the measurement process.

In some embodiments, the second indication information is used to indicate that the measurement process is successfully executed, or that an error occurs in the measurement process.

In some embodiments, the first information further includes an error code and/or error information for an error occurring in the measurement process.

In some embodiments, the error code for an error occurring in the measurement process is used to indicate at least one of the following: a sensing requirement of the second device is not met due to a decrease in a quantity of sensing participants in the measurement process, a sensing requirement of the second device is not met due to a change in an operating mode of a sensing participant in the measurement process, or a load of a basic service set BSS exceeds a preset threshold.

In some embodiments, the sensing process or the measurement setup is terminated based on a first termination frame, and the first termination frame is used to instruct to terminate the sensing process or the measurement setup.

In some embodiments, the first termination frame is transmitted by the first device, or the first termination frame is transmitted by the second device.

In some embodiments, the first termination frame is a public action frame.

In some embodiments, the first termination frame includes an action category field and a public action sub-category field, the action category field is used to indicate that an action frame is a public action frame, and a value of the public action sub-category field is a reserved value for indicating that the public action frame is used to terminate a sensing process.

In some embodiments, the first termination frame is a sensing action frame.

In some embodiments, the first termination frame includes an action category field and a sensing action sub-category field, a value of the action category field is a reserved value for indicating that an action frame is a sensing action frame, and the sensing action sub-category field is used to indicate that the sensing action frame is used to terminate a sensing process.

In some embodiments, the first termination frame includes a session token field, and the session token field is used to indicate a sensing process to be terminated, or an identity of a measurement setup to be terminated.

In some embodiments, the first termination frame further includes a status code field for indicating information on a cause for terminating the sensing process or information on a cause for terminating the measurement setup.

In some embodiments, the first termination frame includes an action category field and a public action sub-category field, the action category field is used to indicate that an action frame is a public action frame, and a value of the public action sub-category field is a reserved value for indicating that the public action frame is a sensing by proxy frame.

In some embodiments, the first termination frame includes an action category field and a sensing action sub-category field, a value of the action category field is a reserved value for indicating that an action frame is a sensing action frame, and the sensing action sub-category field is used to indicate that the sensing action frame is a sensing by proxy frame.

In some embodiments, the first termination frame includes a termination indication field, and the termination indication field is used to indicate whether the sensing by proxy frame is used for a proxy to terminate a sensing process.

In some embodiments, the first termination frame includes a session token field, and the session token field is used to indicate a sensing process to be terminated, or an identity of a measurement setup to be terminated.

In some embodiments, the sensing process or the measurement setup is terminated when a survival time exceeds a first time length.

In some embodiments, the first time length is predefined or indicated by the second device.

In some embodiments, the first time length is transmitted by the second device by using a first request frame, and the first request frame is used to request the first device working as a proxy to establish at least one measurement setup.

In some embodiments, the first information is transmitted by using a first report frame.

In some embodiments, the first report frame is an action frame.

In some embodiments, the first report frame includes a status code field, and the status code field is used to indicate an establishment result of the measurement setup or an execution result of the measurement process.

In some embodiments, the first report frame includes a measurement setup report field for indicating information about a measurement setup that is successfully established.

In some embodiments, the measurement setup report field includes a sensing responder list field and a measurement setup list field, the sensing responder list field is used to indicate at least one sensing responder participating in a measurement setup, and the measurement setup list field is used to indicate information about a measurement setup that is successfully established.

In some embodiments, the measurement setup list field includes at least one measurement setup information field, and each measurement setup information field includes at least one of the following fields:

a measurement setup identity field, used to indicate a measurement setup that is successfully established;

a measurement start time field, used to indicate information about a start time for a measurement;

a measurement instance interval field, used to indicate a time interval between adjacent measurement instances; or a sensing responder bitmap field, used to indicate whether a sensing responder indicated in the sensing responder list field is used as a sensing participant of a measurement setup corresponding to the measurement setup identity.

In some embodiments, the measurement setup identity indicated in the measurement setup identity field belongs to a first measurement setup identity space, and the first measurement setup identity space is used for a measurement setup established due to a proxy request.

Optionally, in some embodiments, the foregoing communications unit may be a communications interface or a transceiver, or an input/output interface of a communications chip or a system-on-chip.

It should be understood that the sensing device 1100 according to the embodiment of this application may correspond to the second device or the sensing by proxy requester in method embodiments of this application, and the foregoing and other operations and/or functions of units in the sensing device 1100 are respectively used to implement corresponding procedures of the second device or the sensing by proxy requester in method embodiments shown in FIG. 8 to FIG. 21. For brevity, details are not described herein again.

Figure 24:
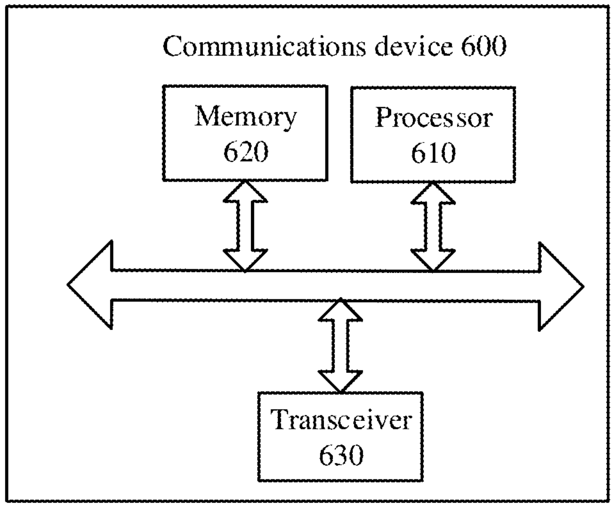
FIG. 24 is a schematic block diagram of a communications device according to an embodiment of this application.

FIG. 24 is a schematic structural diagram of a communications device 600 according to an embodiment of this application. The communications device 600 shown in FIG. 24 includes a processor 610, and the processor 610 may invoke a computer program from a memory and run the computer program to cause the communications device 600 to implement a method in embodiments of this application.

Optionally, as shown in FIG. 24, the communications device 600 may further include a memory 620. The processor 610 may invoke a computer program from the memory 620 and run the computer program to implement a method in embodiments of this application.

The memory 620 may be a separate component independent of the processor 610, or may be integrated into the processor 610.

Optionally, as shown in FIG. 24, the communications device 600 may further include a transceiver 630. The processor 610 may control the transceiver 630 to communicate with another device, and specifically, may send information or data to the another device, or receive information or data sent by the another device.

The transceiver 630 may include a transmitter and a receiver. The transceiver 630 may further include an antenna, and a quantity of antennas may be one or more.

Optionally, the communications device 600 may specifically be the first device or the sensing by proxy device in embodiments of this application, and the communications device 600 may implement corresponding processes implemented by the first device or the sensing by proxy device in methods in embodiments of this application. For brevity, details are not described herein again.

Optionally, the communications device 600 may specifically be the second device or the sensing by proxy requester in embodiments of this application, and the communications device 600 may implement corresponding procedures implemented by the second device or the sensing by proxy requester in methods in embodiments of this application. For brevity, details are not described herein again.

Figure 25:
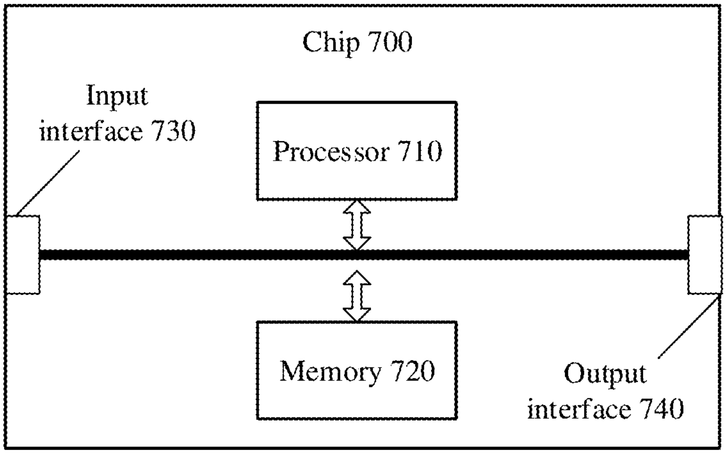
FIG. 25 is a schematic block diagram of a chip according to an embodiment of this application.

FIG. 25 is a schematic diagram of a structure of a chip according to an embodiment of this application. The chip 700 shown in FIG. 25 includes a processor 710, and the processor 710 may invoke a computer program from a memory and run the computer program to implement a method in embodiments of this application.

Optionally, as shown in FIG. 25, the chip 700 may further include a memory 720. The processor 710 may invoke a computer program from the memory 720 and run the computer program to implement a method in embodiments of this application.

The memory 720 may be a separate component independent of the processor 710, or may be integrated into the processor 710.

Optionally, the chip 700 may further include an input interface 730. The processor 710 may control the input interface 730 to communicate with another device or chip, and specifically, may obtain information or data transmitted by the another device or chip.

Optionally, the chip 700 may further include an output interface 740. The processor 710 may control the output interface 740 to communicate with another device or chip, and specifically, may output information or data to the another device or chip.

Optionally, the chip may be applied to the first device or the sensing by proxy device in embodiments of this application, and the chip may implement corresponding processes implemented by the first device or the sensing by proxy device in methods in embodiments of this application. For brevity, details are not described herein again.

Optionally, the chip may be applied to the second device or the sensing by proxy requester in embodiments of this application, and the chip may implement corresponding procedures implemented by the second device or the sensing by proxy requester in methods in embodiments of this application. For brevity, details are not described herein again.

It should be understood that the chip mentioned in this embodiment of this application may alternatively be referred to as a system-level chip, a system chip, a chip system, or a system-on-chip.

Figure 26:
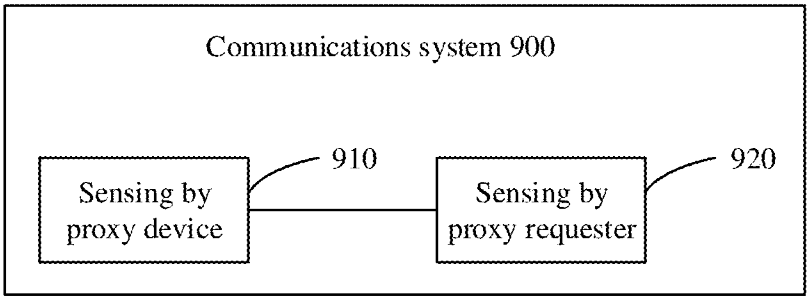
FIG. 26 is a schematic block diagram of a communications system according to an embodiment of this application.

FIG. 26 is a schematic block diagram of a communications system 900 according to an embodiment of this application. As shown in FIG. 26, the communications system 900 includes a sensing by proxy device 910 and a sensing by proxy requester 920.

The sensing by proxy device 910 may be used to implement corresponding functions implemented by the first device or the sensing by proxy device in foregoing methods, and the sensing by proxy requester 920 may be used to implement corresponding functions implemented by the second device or the sensing by proxy requester in foregoing methods. For brevity, details are not described herein again.

It should be understood that, a processor in the embodiment of this application may be an integrated circuit chip having a signal processing capability. In an implementation process, the steps in foregoing method embodiments may be performed by using an integrated logic circuit of hardware of the processor or instructions in a software form. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps and logical block diagrams disclosed in embodiments of this application. The general-purpose processor may be a microprocessor, or the processor may be any conventional processor or the like. The steps of the methods disclosed with reference to embodiments of this application may be directly implemented by a hardware decoding processor, or may be implemented by a combination of hardware and software modules in a decoding processor. The software module may be located in a mature storage medium in the art, for example, a random access memory, a flash memory, a read-only memory, a programmable read-only memory, an erasable programmable memory, or a register. The storage medium is located in a memory. The processor reads information from the memory, and completes the steps of the foregoing methods in combination with hardware in the processor.

It may be understood that the memory in embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct Rambus random access memory (DR RAM). It should be noted that, the memory in the systems and methods described in this specification includes but is not limited to these memories and any memory of another proper type.

It should be understood that, by way of example but not limitative description, for example, the memory in this embodiment of this application may alternatively be a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), a direct Rambus random access memory (DR RAM), or the like. In other words, the memory in this embodiment of this application includes but is not limited to these memories and any memory of another proper type.

An embodiment of this application further provides a computer-readable storage medium, configured to store a computer program.

Optionally, the computer-readable storage medium may be applied to the first device or the sensing by proxy device in embodiments of this application, and the computer program causes a computer to execute corresponding processes implemented by the first device or the sensing by proxy device in methods in embodiments of this application. For brevity, details are not described herein again.

Optionally, the computer-readable storage medium may be applied to the second device or the sensing by proxy requester in embodiments of this application, and the computer program causes a computer to execute corresponding procedures implemented by the second device or the sensing by proxy requester in methods in embodiments of this application. For brevity, details are not described herein again.

An embodiment of this application further provides a computer program product, including computer program instructions.

Optionally, the computer program product may be applied to the first device or sensing by proxy device in embodiments of this application, and the computer program instructions cause a computer to execute corresponding processes implemented by the first device or the sensing by proxy device in methods in embodiments of this application. For brevity, details are not described herein again.

Optionally, the computer program product may be applied to the second device or the sensing by proxy requester in embodiments of this application, and the computer program instructions cause a computer to execute corresponding procedures implemented by the second device or the sensing by proxy requester in methods in embodiments of this application. For brevity, details are not described herein again.

An embodiment of this application further provides a computer program.

Optionally, the computer program may be applied to the first device or the sensing by proxy device in embodiments of this application. When the computer program runs on a computer, the computer executes corresponding processes implemented by the first device or the sensing by proxy device in methods in embodiments of this application. For brevity, details are not described herein again.

Optionally, the computer program may be applied to a second device or a sensing by proxy requester in embodiments of this application. When the computer program is run on a computer, the computer executes the corresponding procedures implemented by the second device or the sensing by proxy requester in methods in embodiments of this application. For brevity, details are not described herein again.

A person of ordinary skill in the art may be aware that, units and algorithm steps in examples described in combination with embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

Those skilled in the art may clearly understand that, for the purpose of convenient and brief description, for detailed working processes of the foregoing system, apparatus, and unit, reference may be made to the corresponding processes in the foregoing method embodiments, and details are not described herein again.

In several embodiments provided in this application, it should be understood that, the disclosed system, apparatus, and method may be implemented in other manners. For example, the described apparatus embodiments are merely examples. For example, unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

Units described as separate components may be or may not be physically separate, and components displayed as units may be or may not be physical units, that is, may be located in one place or distributed on a plurality of network units. Some or all of the units may be selected according to actual needs to achieve the objective of the solutions of the embodiments.

In addition, functional units in embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions in this application essentially, or the part contributing to the prior art, or some of the technical solutions may be implemented in a form of a software product. The computer software product is stored in a storage medium and includes several instructions for instructing a computer device (which may be a personal computer, a server, a network device, or the like) to execute all or some of the steps of the methods in embodiments of this application. The foregoing storage medium includes various media that may store a program code, such as a USB flash drive, a removable hard disk, a read-only memory (ROM), a random access memory (RAM), a magnetic disk, or an optical disk.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application should be subject to the protection scope of the claims.

What is claimed is:

1. A first device used for sensing, comprising a processor and a memory, wherein the memory is configured to store a computer program, and the processor is configured to invoke the computer program stored in the memory and run the computer program, to cause the first device at least to:

transmit first information to a second device, wherein the first information is used to indicate information about a result of establishing a sensing process by the first device, the sensing process comprises an establishment process of a measurement setup and/or a measurement process, and the sensing process is established by the first device based on a proxy request of the second device;

wherein the first information comprises first indication information, and the first indication information is used to indicate a result of establishing a measurement setup by the first device working as a proxy of the second device; wherein the result of establishing a measurement setup comprises successfully establishes the measurement setup or fails to establish the measurement setup;

wherein the sensing process or the measurement setup is terminated based on a first termination frame, and the first termination frame is used to instruct to terminate the sensing process or the measurement setup;

wherein the first termination frame is transmitted by the first device, or the first termination frame is transmitted by the second device;

wherein the first termination frame is a public action frame, and the first termination frame comprises an action category field and a public action sub-category field, the action category field is used to indicate that an action frame is a public action frame, and a value of the public action sub-category field is a reserved value selected from 46 to 255 for indicating that the public action frame is used to terminate a sensing process;

wherein the first termination frame comprises a field used to indicate an identity of a measurement setup to be terminated.

2. The first device according to claim 1, wherein the first information further comprises information about a measurement setup that is successfully established, and the information about a measurement setup that is successfully established comprises at least one of following:

frequency information of sensing measurements, quantity information of sensing responders, or one or more identifiers (IDs) of one or more sensing responders.

3. The first device according to claim 1, wherein the first information further comprises information on a cause for failing to establish the measurement setup, and the information on a cause for failing to establish the measurement setup comprises at least one of following:

a quantity of sensing responders does not meet a sensing requirement of the second device, or a reporting manner of a measurement result of a sensing responder does not meet a sensing requirement of the second device.

4. The first device according to claim 1, wherein the sensing process or the measurement setup is terminated when a survival time exceeds a first time length, and the first time length is predefined or indicated by the second device.

5. The first device according to claim 4, wherein the first time length is transmitted by the second device by using a first request frame, and the first request frame is used to request the first device working as a proxy to establish at least one measurement setup.

6. A second device used for sensing, comprising a processor and a memory, wherein the memory is configured to store a computer program, and the processor is configured to invoke the computer program stored in the memory and run the computer program, to cause the second device at least to:

receive first information transmitted by a first device, wherein the first information is used to indicate information about a result of establishing a sensing process by the first device, the sensing process comprises an establishment process of a measurement setup and/or a measurement process, and the sensing process is established by the first device based on a proxy request of the second device;

wherein the first information comprises first indication information, and the first indication information is used to indicate a result of establishing a measurement setup by the first device working as a proxy of the second device; wherein the establishment result of the measurement setup is success or failure;

wherein the sensing process or the measurement setup is terminated based on a first termination frame, and the first termination frame is used to instruct to terminate the sensing process or the measurement setup;

wherein the first termination frame is transmitted by the first device, or the first termination frame is transmitted by the second device;

wherein the first termination frame is a public action frame, and the first termination frame comprises an action category field and a public action sub-category field, the action category field is used to indicate that an action frame is a public action frame, and a value of the public action sub-category field is a reserved value selected from 46 to 255 for indicating that the public action frame is used to terminate a sensing process;

wherein the first termination frame comprises a field used to indicate an identity of a measurement setup to be terminated.

7. The second device according to claim 6, wherein the first information further comprises information about a measurement setup that is successfully established, and the information about a measurement setup that is successfully established comprises at least one of following:

frequency information of sensing measurements, quantity information of sensing responders, or one or more identifiers (IDs) of one or more sensing responders.

8. The second device according to claim 6, wherein the first information further comprises information on a cause for failing to establish the measurement setup, and the information on a cause for failing to establish the measurement setup comprises at least one of following:

a quantity of sensing responders does not meet a sensing requirement of the second device, or a reporting manner of a measurement result of a sensing responder does not meet a sensing requirement of the second device.

9. The second device according to claim 6, wherein the sensing process or the measurement setup is terminated when a survival time exceeds a first time length, and the first time length is predefined or indicated by the second device.

10. The second device according to claim 9, wherein the first time length is transmitted by the second device by using a first request frame, and the first request frame is used to request the first device working as a proxy to establish at least one measurement setup.

11. A sensing method, comprising:

receiving, by a second device, first information transmitted by a first device, wherein the first information is used to indicate information about a result of establishing a sensing process by the first device, the sensing process comprises an establishment process of a measurement setup and/or a measurement process, and the sensing process is established by the first device based on a proxy request of the second device;

wherein the first information comprises first indication information, and the first indication information is used to indicate a result of establishing a measurement setup by the first device working as a proxy of the second device; wherein the establishment result of the measurement setup is success or failure;

wherein the sensing process or the measurement setup is terminated based on a first termination frame, and the first termination frame is used to instruct to terminate the sensing process or the measurement setup;

wherein the first termination frame is transmitted by the first device, or the first termination frame is transmitted by the second device;

wherein the first termination frame is a public action frame, and the first termination frame comprises an action category field and a public action sub-category field, the action category field is used to indicate that an action frame is a public action frame, and a value of the public action sub-category field is a reserved value selected from 46 to 255 for indicating that the public action frame is used to terminate a sensing process;

wherein the first termination frame comprises a field used to indicate an identity of a measurement setup to be terminated.

12. The method according to claim 11, wherein the first information further comprises information about a measurement setup that is successfully established, and the information about a measurement setup that is successfully established comprises at least one of following:

frequency information of sensing measurements, quantity information of sensing responders, or one or more identifiers (IDs) of one or more sensing responders.

13. The method according to claim 11, wherein the first information further comprises information on a cause for failing to establish the measurement setup, and the information on a cause for failing to establish the measurement setup comprises at least one of following:

a quantity of sensing responders does not meet a sensing requirement of the second device, or a reporting manner of a measurement result of a sensing responder does not meet a sensing requirement of the second device.

* * * * *